US012286224B2

United States Patent
Yates

(10) Patent No.: US 12,286,224 B2
(45) Date of Patent: Apr. 29, 2025

(54) UNMANNED SUPPLY DELIVERY AIRCRAFT

(71) Applicant: W. Morrison Consulting Group Inc., Aliso Viejo, CA (US)

(72) Inventor: William M Yates, Aliso Viejo, CA (US)

(73) Assignee: W. Morrison Consulting Group Inc., Aliso Viejo, CA (US)

( * ) Notice: Subject to any disclaimer, the term of this patent is extended or adjusted under 35 U.S.C. 154(b) by 10 days.

(21) Appl. No.: 18/103,314

(22) Filed: Jan. 30, 2023

(65) Prior Publication Data
US 2023/0303245 A1 Sep. 28, 2023

Related U.S. Application Data

(63) Continuation of application No. 16/901,957, filed on Jun. 15, 2020, now Pat. No. 11,565,805, which is a
(Continued)

(51) Int. Cl.
*B64C 31/02* (2006.01)
*B64C 1/06* (2006.01)
(Continued)

(52) U.S. Cl.
CPC ............ *B64C 31/02* (2013.01); *B64C 1/0683* (2020.01); *B64C 39/08* (2013.01); *B64D 17/80* (2013.01); *B64U 10/25* (2023.01); *B64U 20/70* (2023.01); *B64U 30/12* (2023.01); *B64U 30/14* (2023.01); *B64U 80/70* (2023.01); *B64C 1/0685* (2020.01);
(Continued)

(58) Field of Classification Search
CPC ........... B64C 3/56; B64C 39/08; B64U 30/12; B64U 30/14; B64U 70/20; A63H 27/007
See application file for complete search history.

(56) References Cited

U.S. PATENT DOCUMENTS

| 2,577,287 A | 12/1951 | Sullivan |
| 2,673,047 A | 3/1954 | Scarato |

(Continued)

FOREIGN PATENT DOCUMENTS

| EP | 3010798 A2 | 4/2016 |
| GB | 2564473 | 1/2019 |
| WO | WO2005023642 A2 | 3/2005 |

OTHER PUBLICATIONS

International Preliminary Report on Patentability issued in the related PCT application, PCT/US2019/029946, mailed Mar. 11, 2020, 7 pages.

(Continued)

*Primary Examiner* — Joseph W Sanderson
(74) *Attorney, Agent, or Firm* — Lee & Hayes, P.C.

(57) ABSTRACT

A method of delivering heavy payload using an autonomous UAV able to deliver supply by way of airdrop with more precision and at a lower cost. The UAV is equipped with two movable wing systems that rotate from a stowed position to a deployed position upon jettison of the UAV from a mothership. The UAV can be controlled remotely or it can operate autonomously and the movable wings can include ailerons to effectuate flight control of the UAV. The UAV can be reusable or can be an expendable UAV.

18 Claims, 35 Drawing Sheets

Related U.S. Application Data continuation of application No. 15/967,197, filed on Apr. 30, 2018, now Pat. No. 10,710,715, which is a continuation-in-part of application No. 15/198,946, filed on Jun. 30, 2016, now Pat. No. 10,232,938.

(60) Provisional application No. 62/187,778, filed on Jul. 1, 2015.

(51) Int. Cl.
  *B64C 39/08* (2006.01)
  *B64D 17/80* (2006.01)
  *B64U 10/25* (2023.01)
  *B64U 20/50* (2023.01)
  *B64U 20/70* (2023.01)
  *B64U 30/12* (2023.01)
  *B64U 30/14* (2023.01)
  *B64U 80/70* (2023.01)
  *B64U 70/20* (2023.01)
  *B64U 80/82* (2023.01)
  *B64U 101/64* (2023.01)

(52) U.S. Cl.
  CPC .......... *B64C 2211/00* (2013.01); *B64U 20/50* (2023.01); *B64U 70/20* (2023.01); *B64U 80/82* (2023.01); *B64U 2101/64* (2023.01); *B64U 2201/104* (2023.01); *B64U 2201/20* (2023.01)

(56) References Cited

U.S. PATENT DOCUMENTS

| | | | |
|---|---|---|---|
| 3,669,385 A | | 6/1972 | Glantz et al. |
| 5,035,382 A | | 7/1991 | Lissaman et al. |
| 5,118,052 A | | 6/1992 | Alvarez Calderon F |
| 5,878,979 A | * | 3/1999 | Fisher ................... B64D 17/80 244/49 |
| 6,056,237 A | | 5/2000 | Woodland |
| 6,392,213 B1 | | 5/2002 | Martorana et al. |
| 6,817,573 B2 | | 11/2004 | Harrison et al. |
| 6,889,942 B2 | | 5/2005 | Preston |
| 7,185,846 B1 | | 3/2007 | Bittle et al. |
| 7,210,654 B1 | | 5/2007 | Cox et al. |
| 7,237,750 B2 | | 7/2007 | Chiu et al. |
| 7,261,257 B2 | | 8/2007 | Helou, Jr. |
| 7,338,010 B2 | | 3/2008 | Corder et al. |
| 7,344,109 B1 | | 3/2008 | Rezai |
| 7,410,124 B2 | | 8/2008 | Miller et al. |
| 7,584,925 B2 | | 9/2009 | Miller et al. |
| 7,699,267 B2 | | 4/2010 | Helou, Jr. |
| 7,789,341 B2 | | 9/2010 | Arlton et al. |
| 7,854,410 B2 | | 12/2010 | Fanucci et al. |
| 7,975,774 B2 | | 7/2011 | Akcasu |
| 8,590,831 B2 | | 11/2013 | Afanasyev |
| 8,946,607 B2 | | 2/2015 | Gettinger |
| 9,108,713 B2 | | 8/2015 | Tao |
| 9,296,270 B2 | | 3/2016 | Parks et al. |
| 9,376,207 B2 | | 6/2016 | Becklin et al. |
| 9,434,471 B2 | | 9/2016 | Arlton et al. |
| 9,545,991 B1 | | 1/2017 | Alley et al. |
| 9,689,650 B2 | | 6/2017 | Vainshtein et al. |
| 9,776,719 B2 | | 10/2017 | Elkins et al. |
| 9,868,524 B2 | | 1/2018 | Welsh et al. |
| 9,957,035 B2 | | 5/2018 | Valasek et al. |
| 10,093,417 B2 | | 10/2018 | Meringer et al. |
| 10,232,938 B2 | | 3/2019 | Yates |
| 10,280,904 B2 | | 5/2019 | Larson et al. |
| 10,358,205 B2 | | 7/2019 | Arie et al. |
| 10,479,499 B2 | | 11/2019 | Newman |
| 10,710,715 B2 | | 7/2020 | Yates |
| 11,565,805 B2 | * | 1/2023 | Yates .................... B64U 80/70 |
| 2005/0051667 A1 | | 3/2005 | Arlton et al. |
| 2005/0218260 A1 | | 10/2005 | Corder et al. |
| 2005/0274845 A1 | | 12/2005 | Miller et al. |
| 2006/0011777 A1 | | 1/2006 | Arlton et al. |
| 2006/0108477 A1 | | 5/2006 | Helou, Jr. |
| 2008/0093501 A1 | | 4/2008 | Miller et al. |
| 2009/0026314 A1 | | 1/2009 | Helou, Jr. |
| 2009/0114773 A1 | | 5/2009 | Helou, Jr. |
| 2010/0012774 A1 | | 1/2010 | Fanucci et al. |
| 2010/0065288 A1 | | 3/2010 | Akcasu |
| 2011/0226174 A1 | | 9/2011 | Parks |
| 2012/0091259 A1 | | 4/2012 | Morris |
| 2012/0267473 A1 | | 10/2012 | Tao et al. |
| 2013/0146716 A1 | | 6/2013 | Gettinger |
| 2014/0091172 A1 | | 4/2014 | Arlton et al. |
| 2014/0217230 A1 | | 8/2014 | Helou, Jr. |
| 2015/0183519 A1 | | 7/2015 | Llamas Sandin |
| 2015/0266578 A1 | | 9/2015 | Elkins et al. |
| 2015/0338200 A1 | | 11/2015 | Vainshtein et al. |
| 2016/0009363 A1 | | 1/2016 | Valasek et al. |
| 2016/0121992 A1 | | 5/2016 | Saroka et al. |
| 2016/0167778 A1 | | 6/2016 | Meringer et al. |
| 2017/0001724 A1 | | 1/2017 | Yates |
| 2017/0240276 A1 | | 8/2017 | Zilberstein |
| 2017/0260973 A1 | | 9/2017 | Larson et al. |
| 2018/0086434 A1 | | 3/2018 | Cook et al. |
| 2018/0086454 A1 | | 3/2018 | Cook et al. |
| 2018/0148168 A1 | | 5/2018 | Newman |
| 2018/0281953 A1 | | 10/2018 | Groen |
| 2018/0312252 A1 | | 11/2018 | Yates |
| 2021/0031912 A1 | | 2/2021 | Yates |

OTHER PUBLICATIONS

International Search Report and Written Opinion issued in the related PCT application, PCT/US2019/029946, mailed Jul. 11, 2019, 8 pages.
Partial European Search Report mailed Dec. 17, 2021 for European Patent Application No. 19796924.9, 12 pages.
Extended European Search Report mailed Mar. 24, 2022 for European Patent Application No. 19796924.9, a foreign counterpart to U.S. Pat. No. 10,232,938, 11 pages.
Office Action for U.S. Appl. No. 16/901,957, mailed on May 11, 2022, Yates, "Unmanned Supply Delivery Aircraft", 9 Pages.
Translated Japanese Office Action mailed Feb. 28, 2023 for Japanese patent application No. 2020-559499, a foreign counterpart of U.S. Pat. No. 10,232,938, 5 pages.
European Office Action mailed Sep. 28, 2023 for European Patent Application No. 19796924.9, a foreign counterpart to U.S. Pat. No. 10,232,938, 4 pages.
Israeli Office Action mailed Sep. 26, 2023 for Israeli Application No. 278083, a foreign counterpart to U.S. Pat. No. 10,232,938, 5 pages.
Office Action for Israeli Application No. 278083, Dated Apr. 17, 2024, 3 pages.

* cited by examiner

UNMANNED SUPPLY DELIVERY AIRCRAFT

This application claims priority to and is a Continuation application of U.S. patent application Ser. No. 16/901,957, filed on Jun. 15, 2020, which will issue as U.S. Pat. No. 11,565,805 on Jan. 31, 2023, which claims priority to and is a Continuation application of U.S. patent application Ser. No. 15/967,197, filed on Apr. 30, 2018, now known as U.S. Pat. No. 10,710,715, which issued on Jul. 14, 2020, which claims priority to and is a Continuation-in-Part application of U.S. patent application Ser. No. 15/198,946, filed on Jun. 30, 2016, now known as U.S. Pat. No. 10,232,938, which issued on Mar. 19, 2019, which claims the benefit of U.S. Provisional Application No. 62/187,778, filed on Jul. 1, 2015, all of which are incorporated herein by reference.

FIELD OF THE INVENTION

The present invention relates to an air delivery unmanned aircraft system.

BACKGROUND OF THE INVENTION

The ability to provide supplies in remote areas has always been a problem. Current supply methods typically involve convoys and air supply methods. However, providing an accurate delivery of supply can be very challenging and expensive.

The most accurate method of delivery has always been by land transportation. This methodology faces a number of challenges when the destination is in remote or potentially hazardous areas. Aside for the expense of the delivery and the time it takes, land transportation can also be subject to assaults, ambush or exposure to improvised explosive devices along the way.

Air transportation can solve some of the above issues related with land transport, however, it is still very expensive and often times impractical depending on the location in which delivery is to be made. For example, this method can be impractical in places with dense vegetation and many canals and rivers. The landscape can make it difficult or even impossible at times for an aircraft to land. Airdrop requires a low flying aircraft that can be impractical in some instances. Also, the accuracy of providing supply via airdrop can often be less than desirable and inconsistent. Joint Precision Airdrop System "JPADS" is a current program of the U.S. Military that employs GPS steerable parachutes to attempt to guide heavy air dropped items from a cargo aircraft such as the C-5, C-17, C-130, or from heavy lift helicopters such as the V-22 and CH-53. JPADS is known to cost on the order of $30,000 per drop, and the limitations of steering a parachute through varied weather systems and from various drop altitudes has caused numerous payloads meant to resupply troops to become lost, damaged or inaccessible. A number of military personnel have become injured and killed during the process of searching for and retrieving items delivered via such steerable parachute drops. Accordingly, the U.S. Government has indicated an interest in increasing the accuracy of such troop resupply capabilities while simultaneously reducing the cost of such deliveries as much as tenfold. Many civil organizations have also expressed an interest in being able to precisely delivery heavy payloads of resupply materials such as during national disasters from airborne delivery platforms which obviate the need for landing zones, airports, ground transportation or to avoid such things as penetrating another nation's national borders while still being able to deliver relief supplies to such a nation from a safe, airborne standoff distance and altitude. Other relief missions such as stranded hikers, disabled ships, boats, or sailing vessels present logistical rescue difficulties where it is desirable to have the ability to precisely provide immediate emergency relief supplies, equipment, food, water, medical equipment such as medicines, oxygen, cardiac defibrillators and the like, or bilge pumps, life rafts and other equipment to prevent a vessel from sinking or to save the lives of people aboard a stricken vessel.

With the above problems in mind, it is needed a more efficient and cost effective method of providing supply that avoids one or more of the above stated problems.

SUMMARY OF THE INVENTION

Accordingly, the present invention is directed to an air delivery unmanned aircraft system that substantially obviates one or more of the problems due to limitations and disadvantages of the related art.

An advantage of the present invention is that it provides a cost effective, safe and accurate supply delivery system.

Another advantage is that it provides a cargo container that contains folded wings and can quickly and easily be deployed for tactical resupply or disaster relief.

Still another advantage of the present invention is that it provides an easily deployable supply delivery aircraft that may be deployed from a large variety of cargo rotorcraft and fixed wing aircraft at various altitudes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an unmanned delivery aircraft including a fuselage cargo container. The fuselage cargo container having a lid and a fuselage portion, a front pivoting wing system connected to the lid, a rear pivoting wing system connected to the lid, a guidance control system, and one or more flight controls operable by the guidance control system. Each of the front and rear pivoting wing assemblies can pivot from a stowed position to a deployed position. The front and rear pivoting wing systems can each include two pivoting wings. The lid can be detachably connected to the fuselage portion. At least one latch can secure the lid to the fuselage portion, which can include one or more handles. The fuselage cargo container can be airtight. Each pivoting wing system can also include a movable flight control surface. At least one actuator on each wing system can be used to move the flight control surface for that wing system. One or more torsion springs can be located at a pivot point of at least one of the front and rear wing systems. An extension spring may connect one individual wing from the front wing system to one individual wing from the rear wing system such that the spring force pulls the connected wings open in opposite directions. The guidance control system can be operated in autonomous or manual modes. One or more static lines can be attached to the front and rear wing systems to trigger their deployment. A nose cone can be detachably connected to the fuselage cargo container. All or a portion of the guidance control system can be located inside the nose cone. The first and second pivoting wing systems can consist of four total wings that each pivot 90 degrees between stowed and deployed positions.

In accordance with another embodiment of the present invention, as broadly described an unmanned delivery aircraft having a fuselage. The fuselage can include a lid detachably connected to the fuselage. The aircraft can further include at least two wings pivotally connected to opposing ends of the lid, at least a torsion spring located at a pivot point of the at least two wings on each end, and a guidance control system.

In accordance with another embodiment of the present invention, as broadly described an unmanned supply delivery aircraft having a fuselage capable of storing supplies, at least four pivoting wings connected to a lid, the lid detachably connected to the fuselage, the wings each having a stowed position and a deployed position. The aircraft may also have a guidance control system and one or more flight controls operable by the guidance control system. The at least four wings can pivot from the stowed position to the deployed position after being jettisoned from the mothership. The guidance control system operates the at least one flight control during flight. The fuselage can be a mobile storage case having provisions to be easily moved after landing. The mobile storage case can have at least one of carrying handles, wheels, and channels to accommodate forklift skids. Two of the aircraft's four pivoting wings can be the front wings and two of the pivoting wings can be the rear wings. The pivoting wings can be restrained in the stowed position and spring loaded towards the deployed position. The guidance control system can be autonomous. A ground-sensing device such as a laser altimeter can signal the aircraft to begin to flare prior to landing.

In accordance with another embodiment of the present invention, as broadly described an unmanned aerial vehicle including a fuselage able to store supply, a movable wing system in which one or more wings can be moved from a stowed position to a deployed position, a guidance control system, and flight controls.

In accordance with another embodiment of the present invention, as broadly described an unmanned delivery aircraft including a fuselage cargo container. The fuselage cargo container having a lid and a bottom portion, a first pivoting wing system connected to the lid, a second pivoting wing system connected to the lid, a guidance control system, and one or more flight controls operable by the guidance control system. Each of the first and second pivoting wing assemblies can pivot from a stowed position to a deployed position. The first and second pivoting wing systems can each include either a single pivoting wing, or two or more pivoting wings. The first and second pivoting wing systems can have the same design. The first pivoting wing system can include main wings and the second pivoting wing system can include canard wings. The lid can be detachably connected to the bottom portion. At least one latch can secure the lid to the bottom portion. The fuselage cargo container can include at least one storage compartment. The fuselage cargo container can include one or more handles. The fuselage cargo container can be airtight. Each pivoting wing system can also include a movable flight control surface. At least one actuator on each wing system can be used to move the flight control surface for that wing system. One or more torsion springs can be located at a pivot point of at least one of the first and second wing systems. The guidance control system can be operated in autonomous or manual modes. A drogue parachute can be attached to the fuselage cargo container. A nose cone can be detachably connected to the fuselage cargo container. The guidance control system can be located inside the nose cone. The first and second pivoting wing systems can each pivot 90 degrees.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
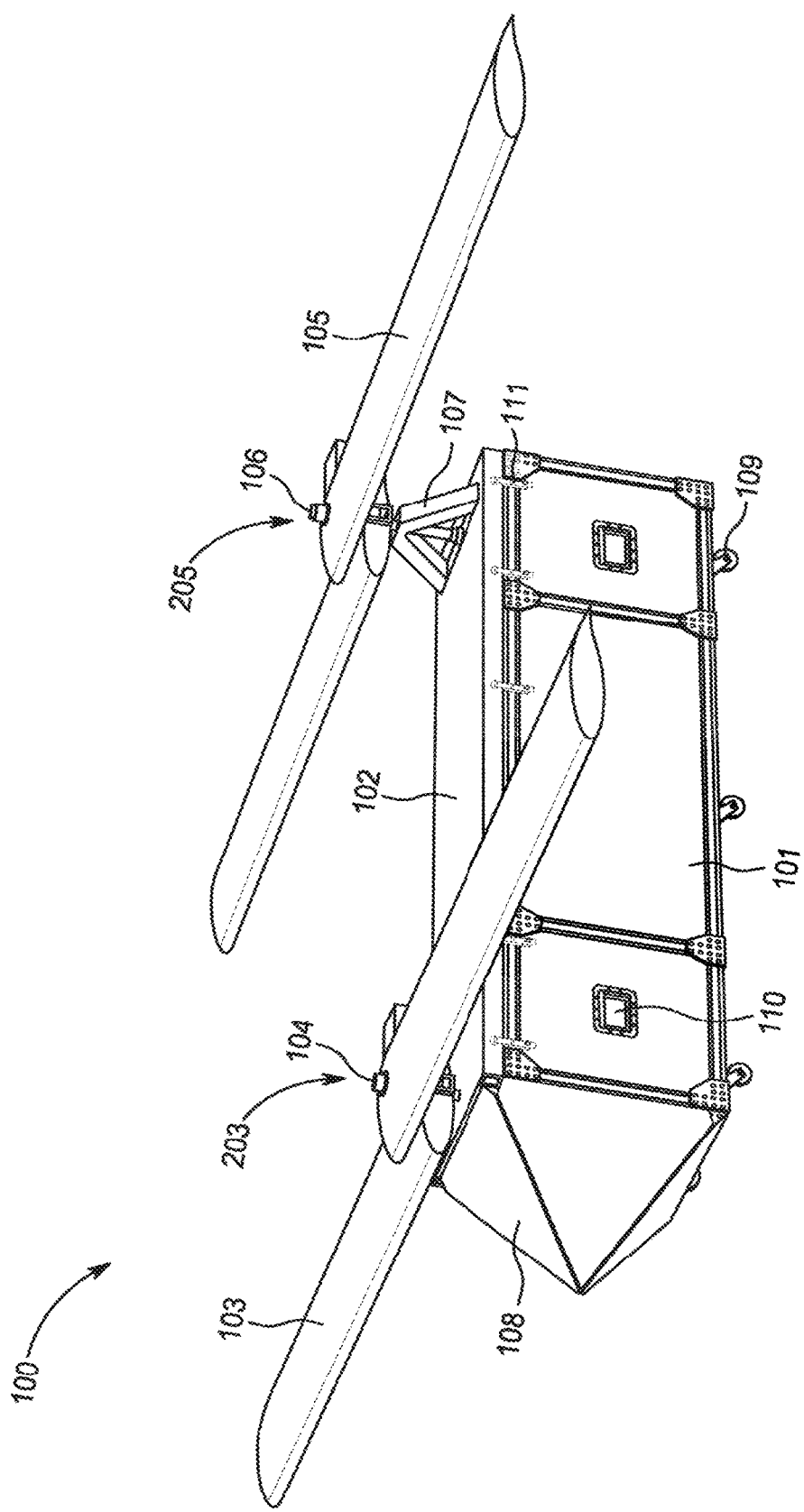
FIG. 1 is a wings deployed view of an exemplary embodiment of the UAV of the present invention.

A wings deployed view of an exemplary embodiment of the UAV of the present invention is illustrated in FIG. 1. The exemplary embodiment can include an unmanned aerial vehicle (UAV) 100, that can include a fuselage 101, a lid 102, a front pivoting wing system 203 including wings 103 having a front shaft 104, a rear pivoting wing system 205 including wings 105 having a rear shaft 106 and mounted to a riser 107, a nose cone 108, optional caster wheels 109, handles 110 and one or more latches 111 to secure the lid 102 to the fuselage 101. In FIG. 1, the lid 102 is attached to or engaged with the fuselage 101 in a wings-up orientation.

Figure 2:
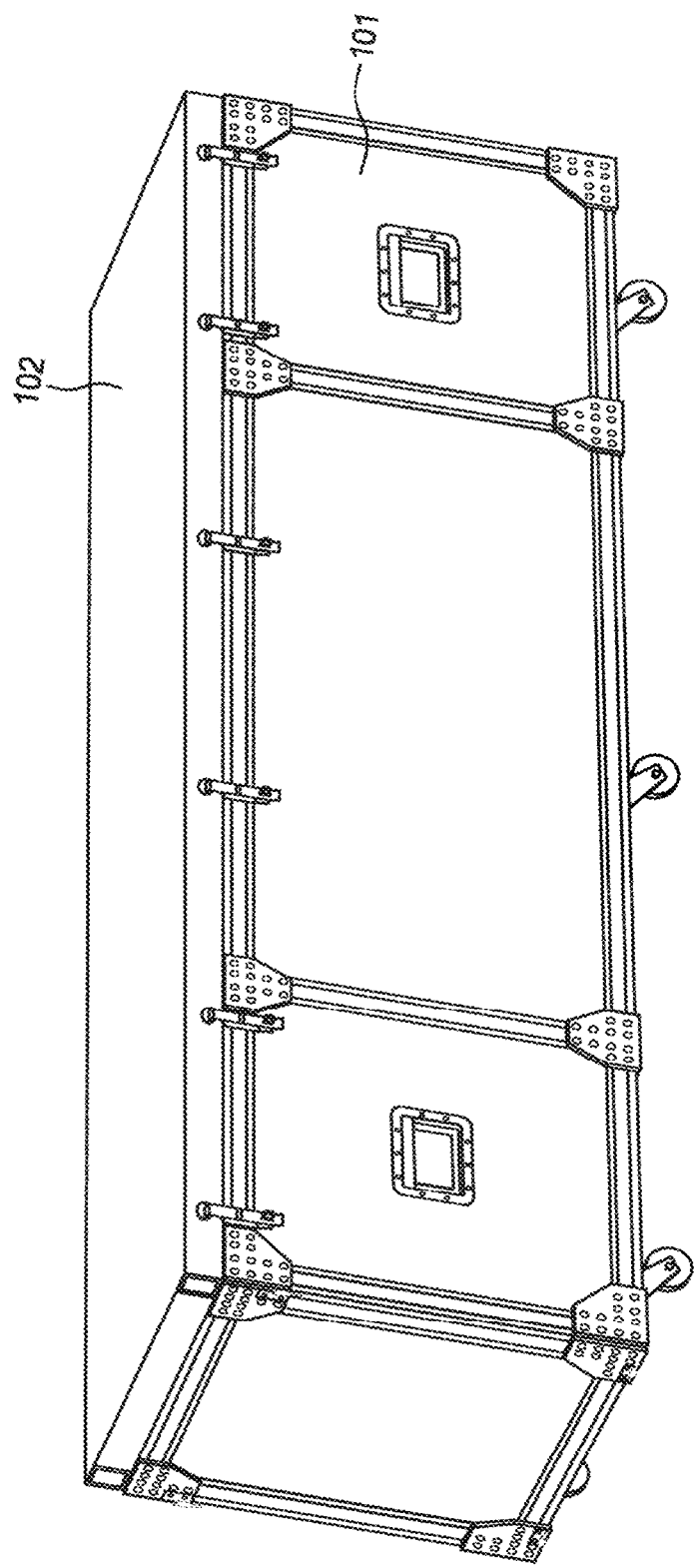
FIG. 2 is an exemplary embodiment of the UAV of the present invention with the pivoting wings attached to the underside of the lid in a stowed position for transportation.

FIG. 2 is a view of the UAV of the present invention with the pivoting wing systems including pivoting wings attached to the underside of the lid 102 in a stowed position and hidden from view inside the fuselage 101 for transportation to a theater of operations where the UAV is needed. In FIG. 2, the lid 102 is attached to the fuselage 101 in a wings-down orientation and accordingly, the wings are contained inside the fuselage 101 and hidden from view.

Each of the front and rear pivoting wing systems 203 and 205 can each include a single pivoting wing. In alternative embodiments, the front and rear pivoting wing systems 203 and 205 can each include two pivoting wings. In yet alternative embodiments, each pivoting wing system can include more than two wings, for example three or four pivoting wings. For illustration purposes only, the description refers to an embodiment in which both pivoting wing systems 203 and 205 each have two pivoting wings 103 and 105 respectively. However, this is only illustrative and should not be viewed as limiting to the scope of the invention.

As illustrated in FIG. 1, each pivoting wing of the pivoting wing systems is attached to the lid. The one or more pivoting wings 103 of the front pivoting wing system 203 are attached at a first end portion of the lid. The one or more pivoting wings 105 of the rear pivoting wing system 205 are attached to a second end portion of the lid, where the first and second ends are opposite ends. As illustrated, the term "end portion" when referring to the lids with regards to the location of the one or more pivoting wings does not require that the wings be located at the edge of the lid. The term "end portion" is used to indicate an area spanning from one edge at one end of the lid up to half way to the opposite edge of the lid.

Figure 3:
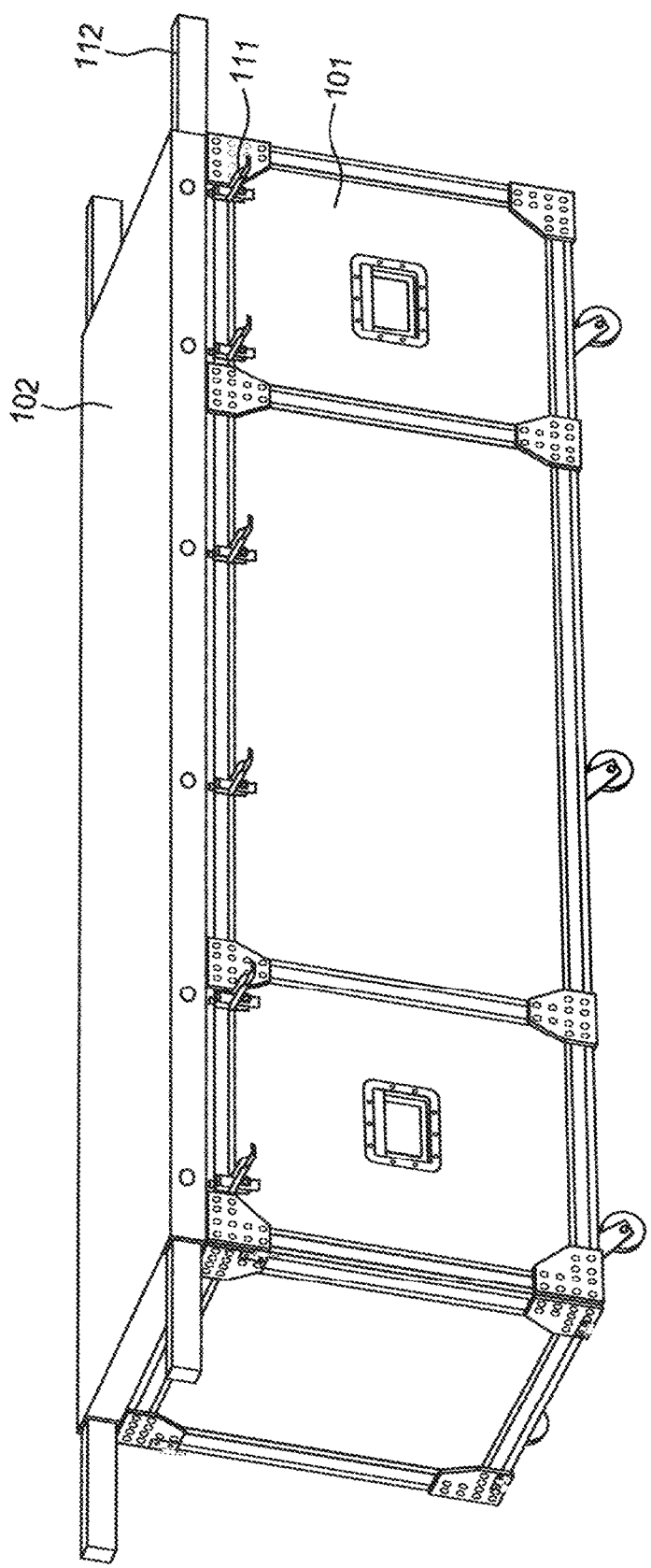
FIG. 3 is an exemplary embodiment of the UAV of the present invention with handles inserted in the lid and latches holding the lid to the fuselage in the open position.

FIG. 3 shows an exemplary set of four lid handles 112 inserted in the ends of the lid structure, which may be released from their stowed position inside the lid structure by releasing one or more latches 111 holding the lid to the fuselage. The lid handles 112 may then be used by two or more operators to lift the lid 102 up and away from the fuselage 101.

Figure 4:
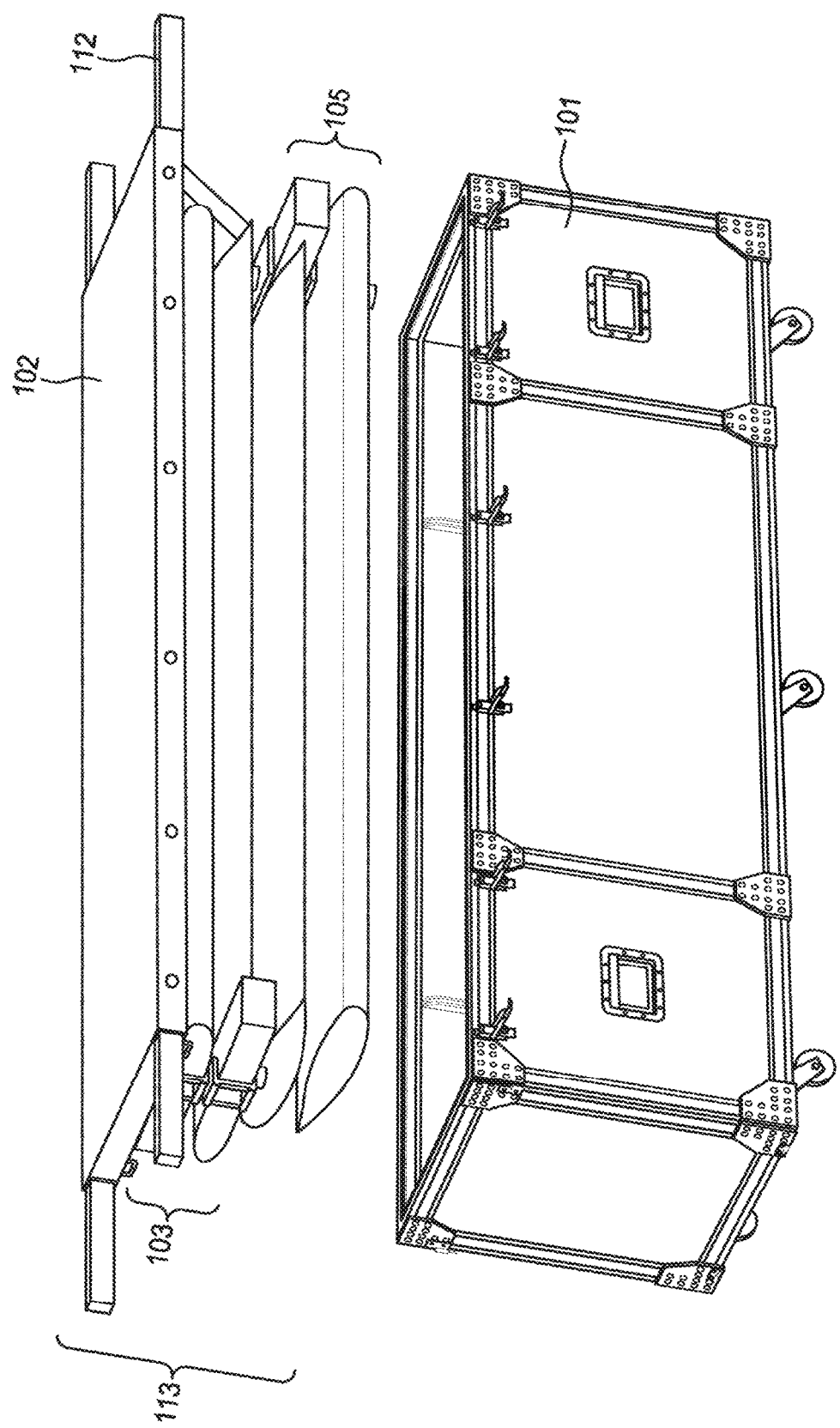
FIG. 4 is an exemplary embodiment of the UAV of the present invention with the lid raised from the fuselage exposing the four pivoting wings in the stowed position.

FIG. 4 is a view of the lid 102 raised from the fuselage 101 by way of the lid handles 112. This view illustrates the novelty of utilizing the lid assembly 113 to both seal the fuselage 101 during transportation as well as to provide the mounting structure and pivoting mechanism for front wings 103 and rear wings 105. It can be readily appreciated by a person practicing the present invention that when the lid assembly 113 is installed in a wings-down orientation, the lid 102 performs the role of a cargo box lid and conveniently houses the wings in an upside-down position inside the cargo storage area of the fuselage 101 during transportation to a theater of operations. Conversely, when the lid 102 is installed onto the fuselage in a wings-up orientation, the cargo area of the fuselage is rendered empty and ready for cargo and supplies to be loaded and the wings are outside of the fuselage 101 and ready for deployment and subsequent flight.

Figure 5:
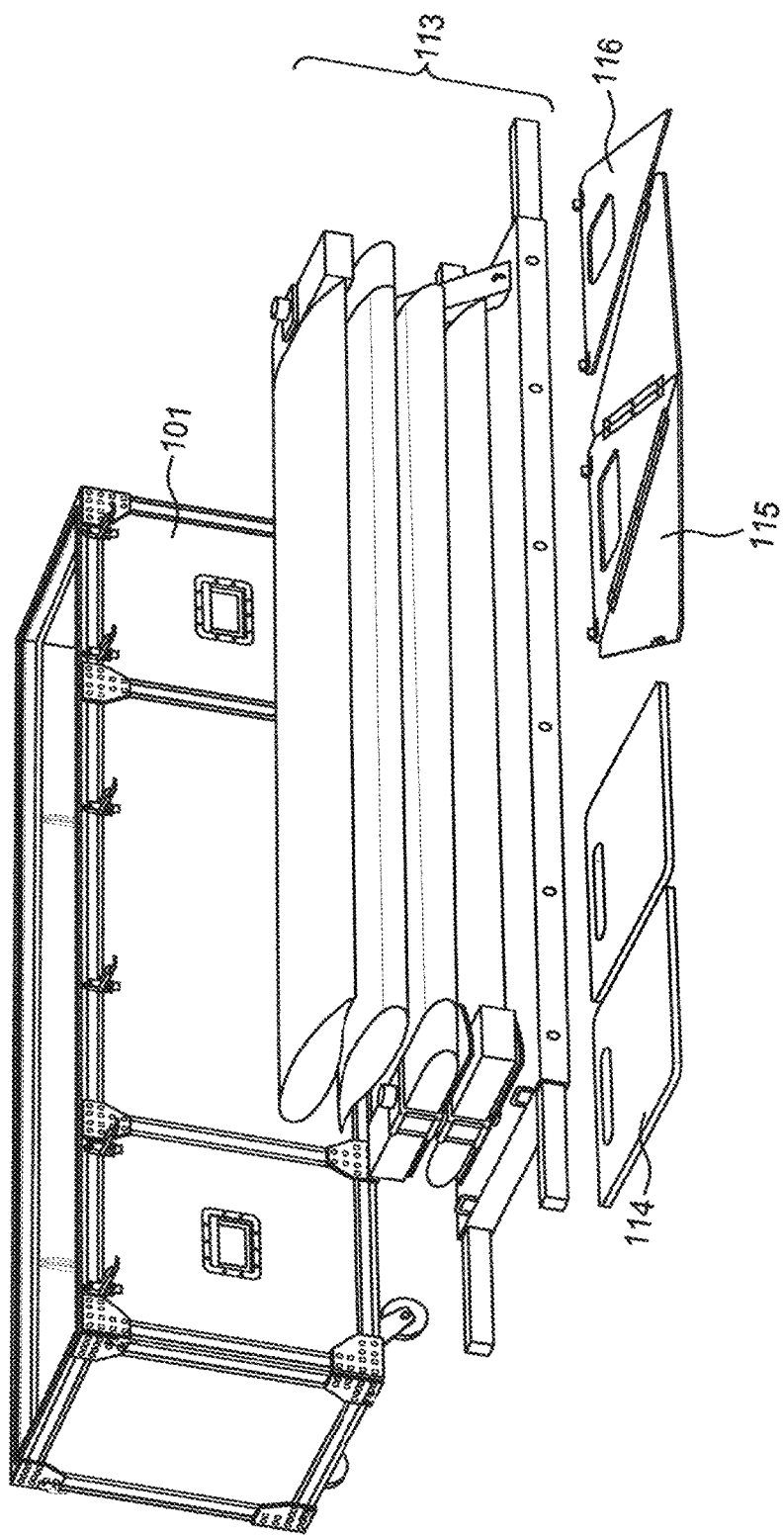
FIG. 5 is an exemplary embodiment of the UAV of the present invention with the lid set aside and cargo bulkheads and nosecone components removed from the fuselage for assembly.

FIG. 5 is a view with the lid assembly 113 set aside in a wings up orientation and revealing that one or more optional cargo bulkheads 114 and nosecone components such as a lower nosecone 115 and upper nosecone 116 have been removed from inside the cargo area of the fuselage 101 where they occupied space between the lowest-hanging wing and the floor of the cargo storage area and are now available to an operator for assembly into and onto the fuselage 101.

Figure 6:
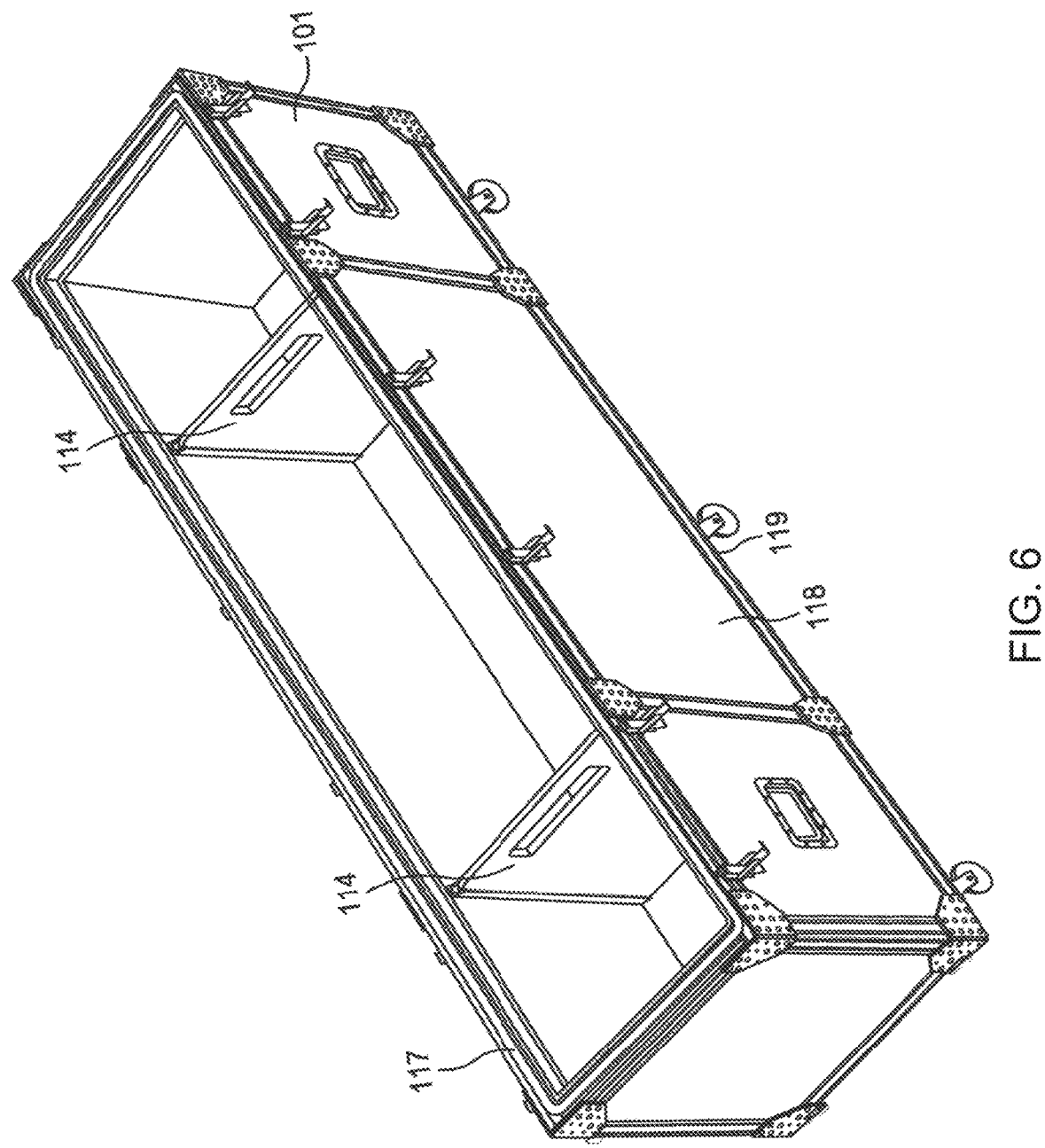
FIG. 6 is an exemplary embodiment of the UAV of the present invention with cargo bulkheads installed in the fuselage and the fuselage ready to receive cargo for tactical resupply or disaster relief.

FIG. 6 is a view of the cargo bulkheads 114 installed in the fuselage 101. In this configuration, the fuselage 101 is ready to receive cargo for tactical resupply or disaster relief in accordance with the objectives of the present invention. As illustrated, fuselage 101 includes an open side to receive cargo. The lid 102 can engage fuselage 101 at the open side. An optional seal 117 may be installed around a sealing surface of the fuselage 101 to engage with lid 102 to create an air-tight and/or watertight seal. This is necessary in situations where a person practicing the present invention desires to have the UAV land in or around water and to float for a period of time after landing during which time a recovery of the UAV may be performed by the recipients of the resupply or cargo onboard. The fuselage 101 may be constructed from a variety of materials such as wood and foam sandwich panels 118 that are mountably located inside a perimeter frame such as may be constructed from aluminum extrusion 119.

Figure 7:
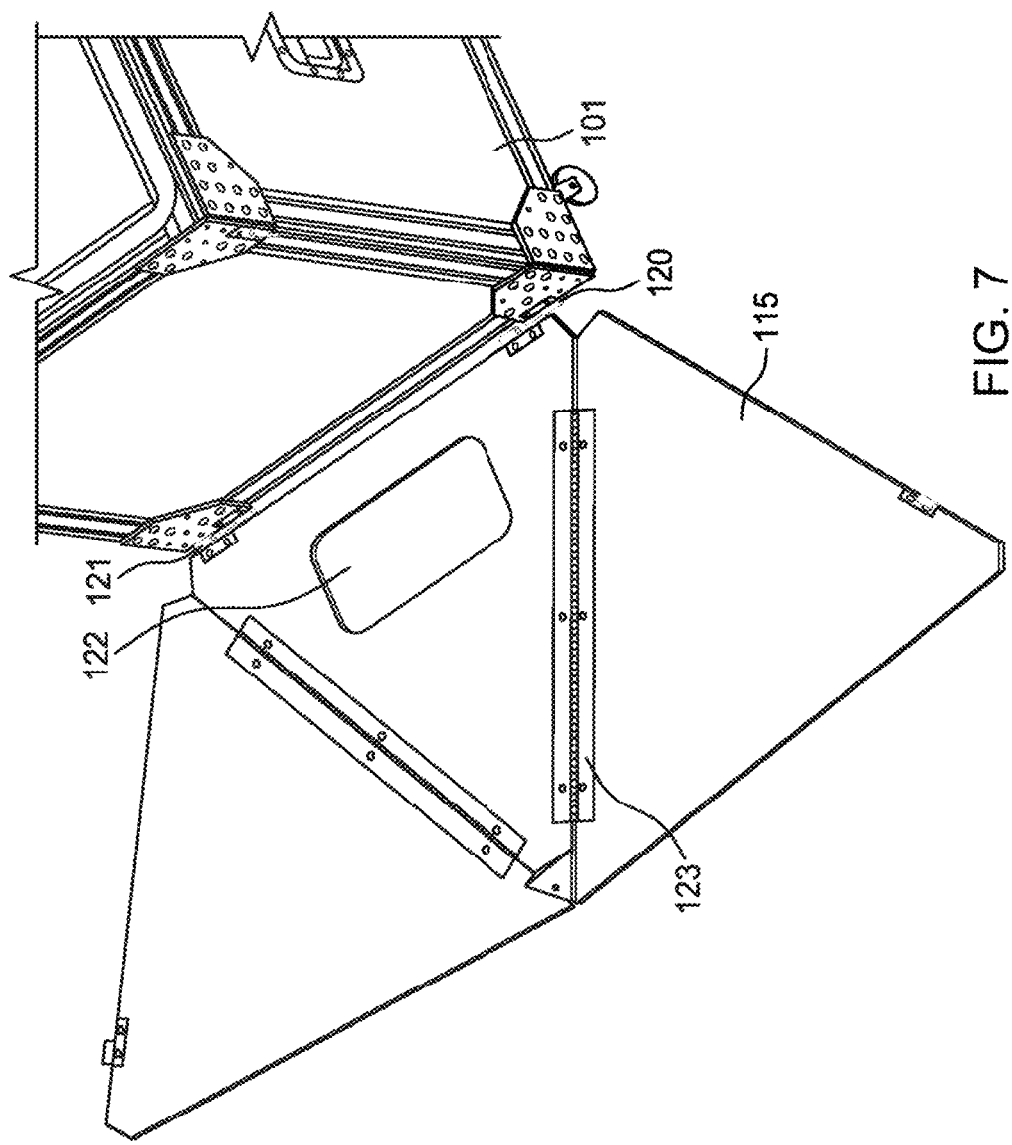
FIG. 7 is an exemplary embodiment of the UAV of the present invention with nose cone components being installed into place on the fuselage.

FIG. 7 is a view of lower nosecone 115 being installed into place on the fuselage 101. A hinge pin 120 may be used to matably engage a corresponding hinge pin socket 121 and sides of lower nosecone 115 may utilize hinges 123 to allow easy folding into position for mounting to the front end of the fuselage 101. An optional lower window 122 may be provided in lower nosecone 115 to allow the use of cameras or sensors such as infrared, radar, or LiDAR to "see" the ground or other obstacles during flight and landing routines for sense and avoid, landing flare initiation or data acquisition purposes.

Figure 8:
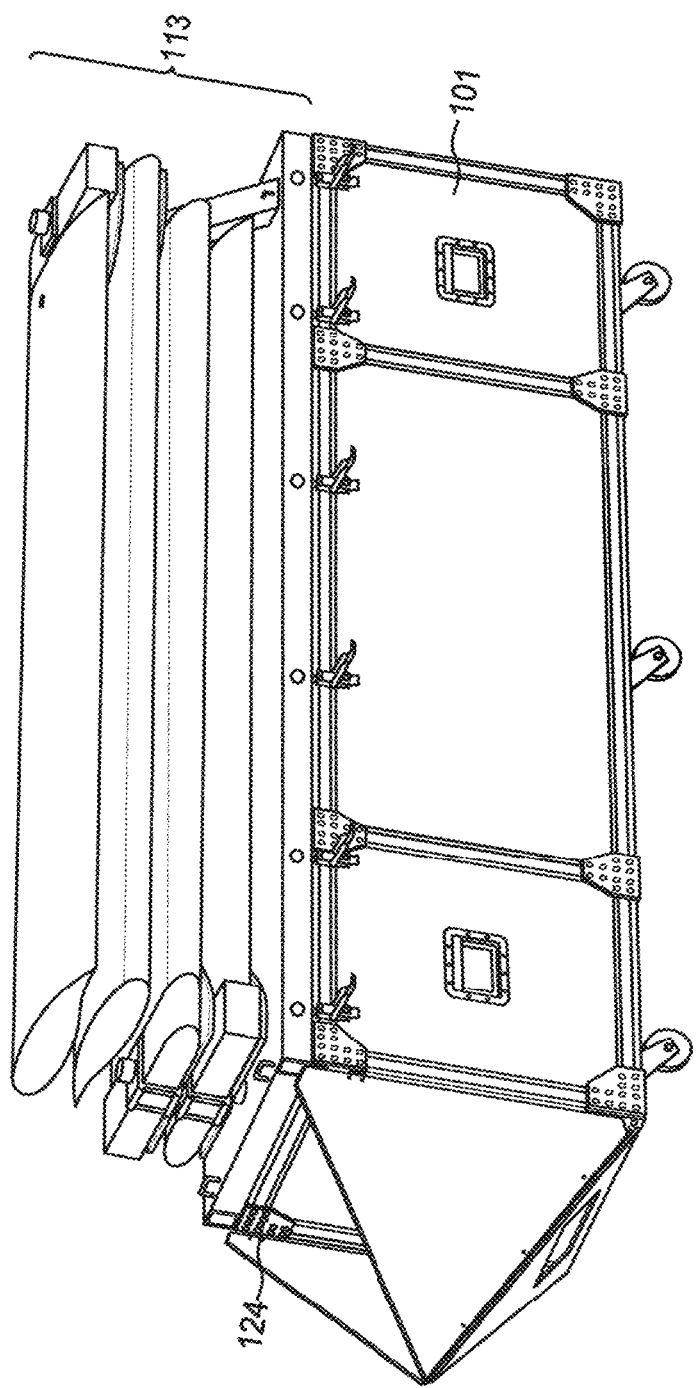
FIG. 8 is an exemplary embodiment of the UAV of the present invention with the lid reinstalled on the fuselage, but in the wings up position.

FIG. 8 is a view of the fuselage 101 with the lid assembly 113 reinstalled on the fuselage in the wings-up position. Upper retainers 124 that are similar or identical to hinge pin 120 and hinge pin socket 121 may be used to hold the sides of the nosecone 108 in an attached configuration to the fuselage 101.

Figure 9:
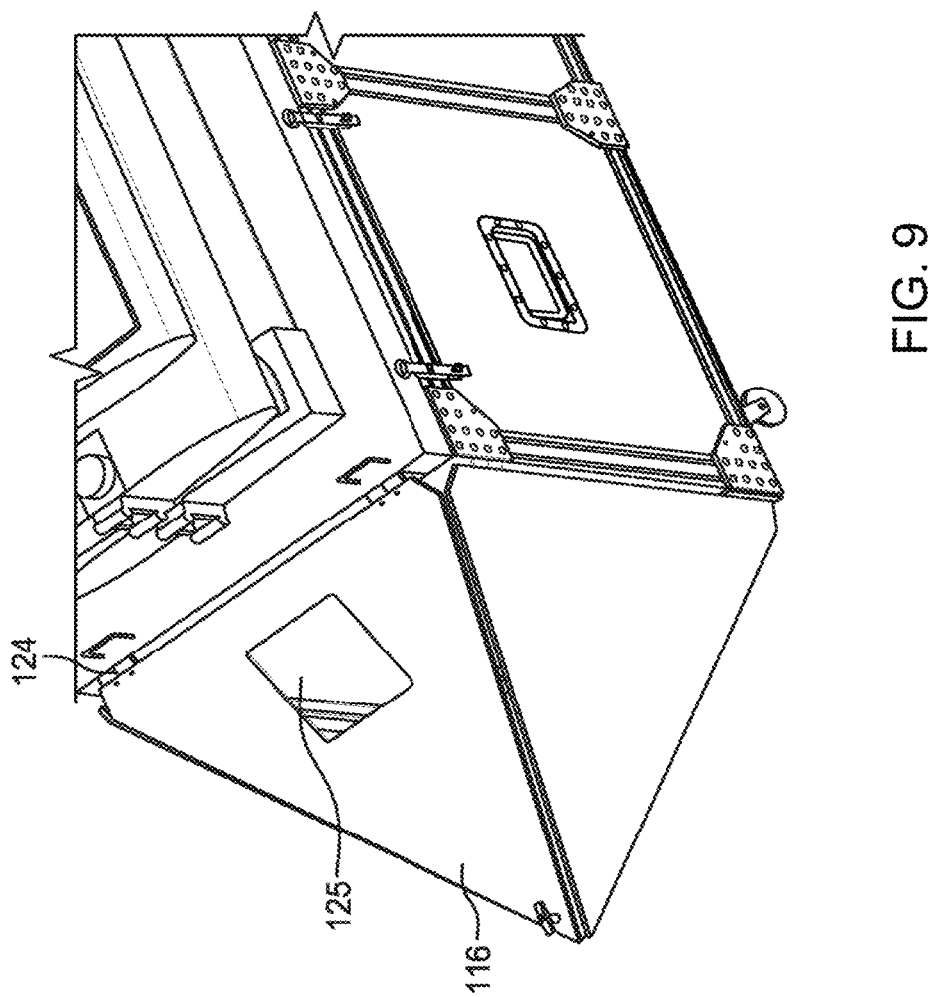
FIG. 9 is an exemplary embodiment of the UAV of the present invention with nose cone details.

FIG. 9 is a view of greater nosecone 108 details and shows an upper nosecone 116 with an optional upper window 125 that may be employed so that a person practicing the present invention can see the status lights of any navigation or GPS electronics located inside the nosecone 108 and/or to provide a clear view of the sky for a GPS receiver or other electronics that send and receive signals. The upper window 125 may be attached to the fuselage 101 by retainers 124, which may be configured as hinges to allow the upper nosecone 116 to be pivotably opened and closed by an operator.

Figure 10:
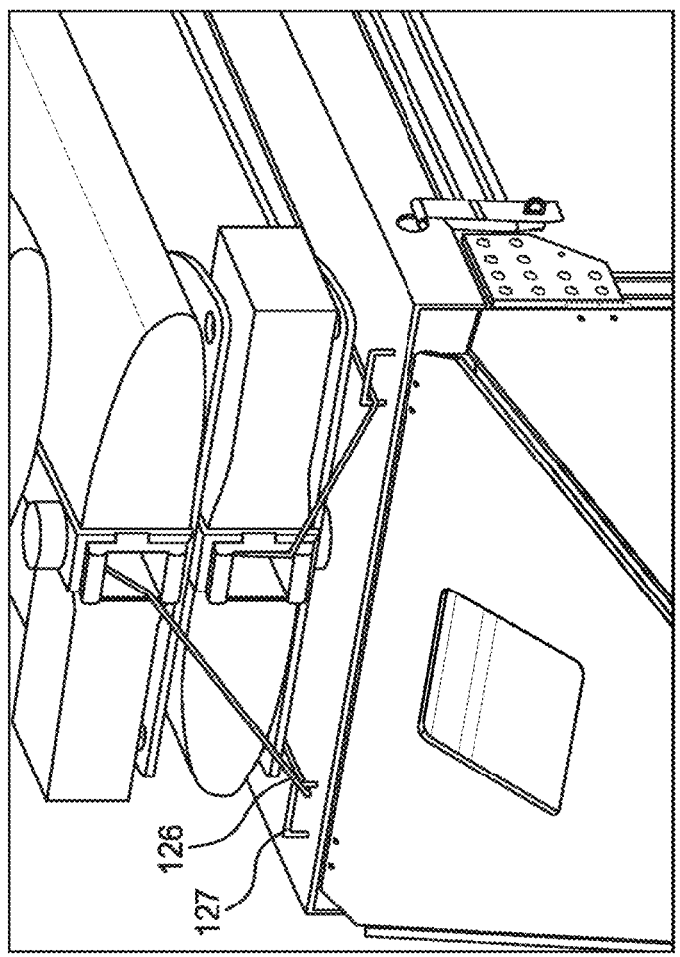
FIG. 10 is an exemplary embodiment of the UAV of the present invention with static line details.

FIG. 10 is a view of the front end of the UAV showing one or more static lines 126 that can be used to trigger the wings to spring open during deployment. Static lines 126 may be used in conjunction with optional guides 127 to route them to avoid entanglement during the wing opening sequence or to guide them to a particular end of the UAV where the one or more static lines 126 may be combined together and attached to a cargo aircraft that will be used to jettison the UAV during deployment.

Figure 11:
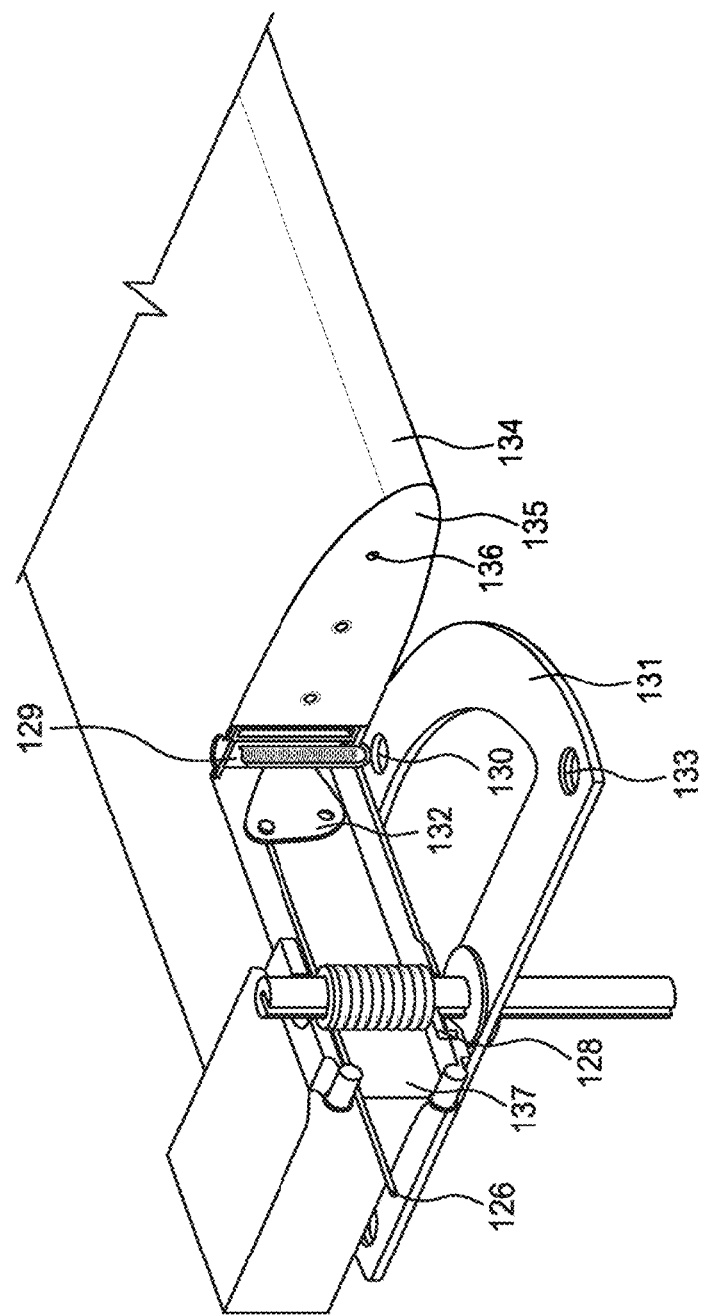
FIG. 11 is an exemplary embodiment of the UAV of the present invention with a cutaway view of an exemplary wing deployment mechanism.

FIG. 11 is a cutaway view of an exemplary wing deployment mechanism of wing systems 203 and 205. A torsion spring 128 may be used to provide spring force to deploy the wings open. A spring-loaded plunger 129 may be used to lock one or more wings into stowed and deployed positions, which in one embodiment may be 90 degrees rotationally apart from each other. The spring-loaded plunger 129 engages a stowed hole 130 which holds at least one wing in the stowed position by counteracting the rotational force of the torsion spring 128 until deployment is triggered such as by a static line 126 operating directly on the spring-loaded plunger 129 or on an optional rocker arm 132 depending on the orientation of the wing deployment mechanism. Once triggered, the torsion spring 128 causes at least one wing to rotate towards a deployed hole 133 located in a lock plate 131. During wing rotation, the spring-loaded plunger 129 is forced into its bore and travels along lock plate 131 until reaching deployed hole 133 where the spring force of the plunger engages the deployed hole 133 in lock plate 131 and causes the at least one wing to stop at the desired location. FIG. 11 also shows a portion of one or more wings construction including a wing skin 134, which may be fiberglass, plastic, heat-shrink plastic or any other material a person practicing the present invention desires to use. The shape of each wing may be defined by the shape of an inner foam core 135 which may have one or more stringer rods 136 for structural and locational purposes. A wing spar 137 provides strength along the length of the wing. The use of spring-loaded plungers 129 is not meant to be limiting. Alternative mechanisms can include latches, pins and other such mechanisms to release and then lock the wings between stowed and deployed positions without departing from the spirit of the present invention.

Figure 12:
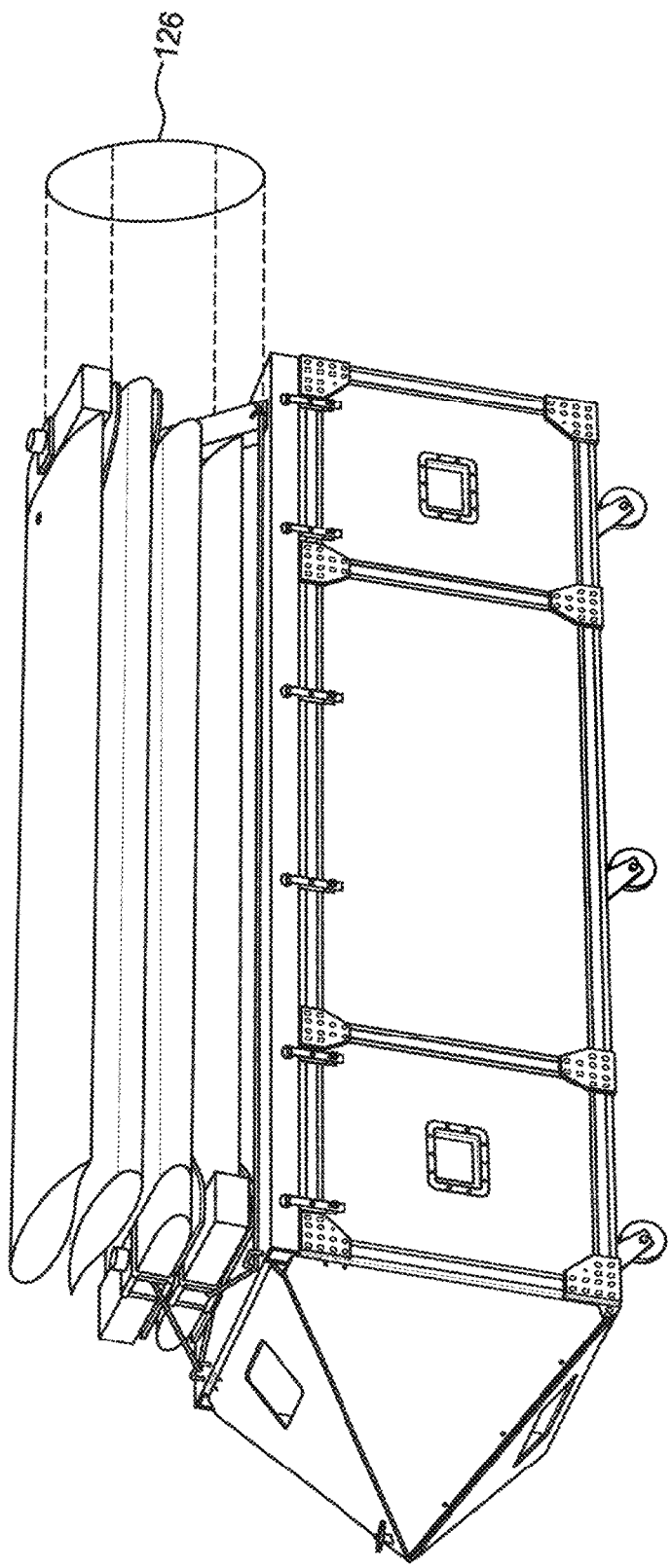
FIG. 12 is an exemplary embodiment of the UAV of the present invention with static lines shown and ready for deployment from a cargo fixed-wing aircraft or rotorcraft.

FIG. 12 is a view with static lines 126 shown and ready for deployment from a cargo carrying fixed-wing aircraft or rotorcraft.

Figure 13:
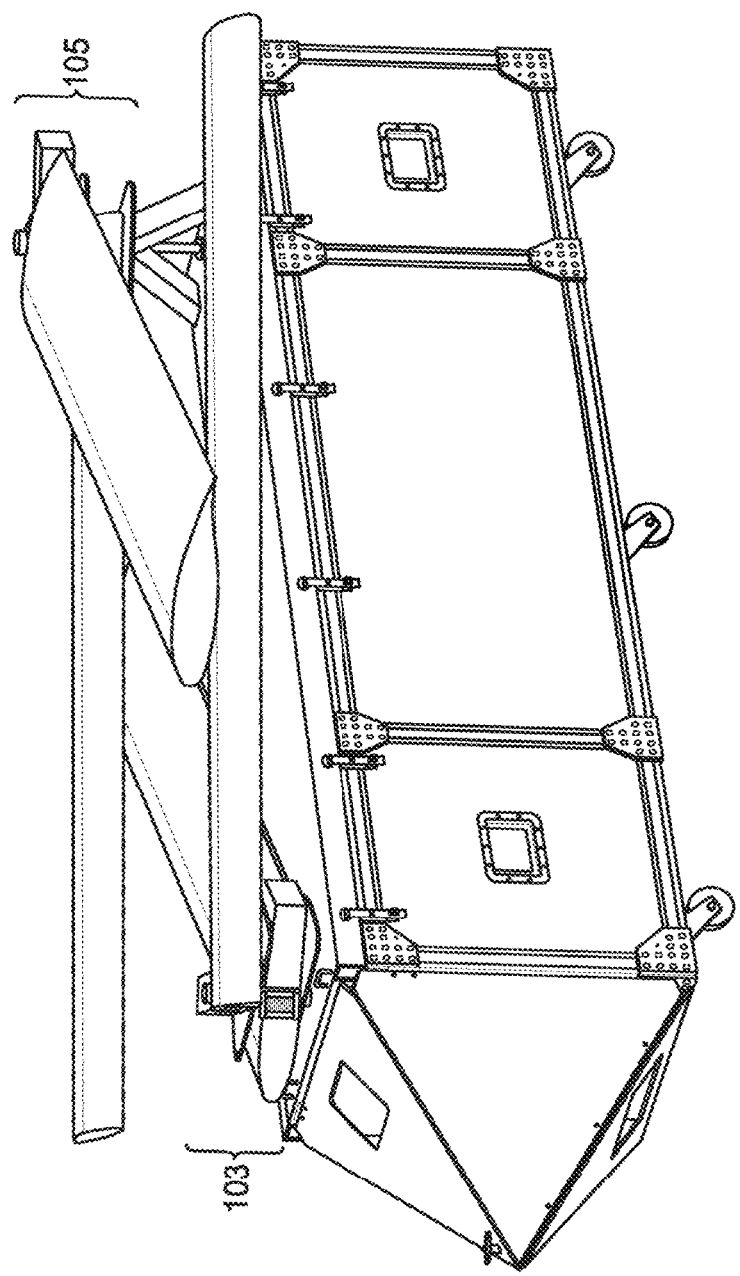
FIG. 13 is an exemplary embodiment of the UAV of the present invention with front and rear wings shown in a partially deployed position.
Figure 14:
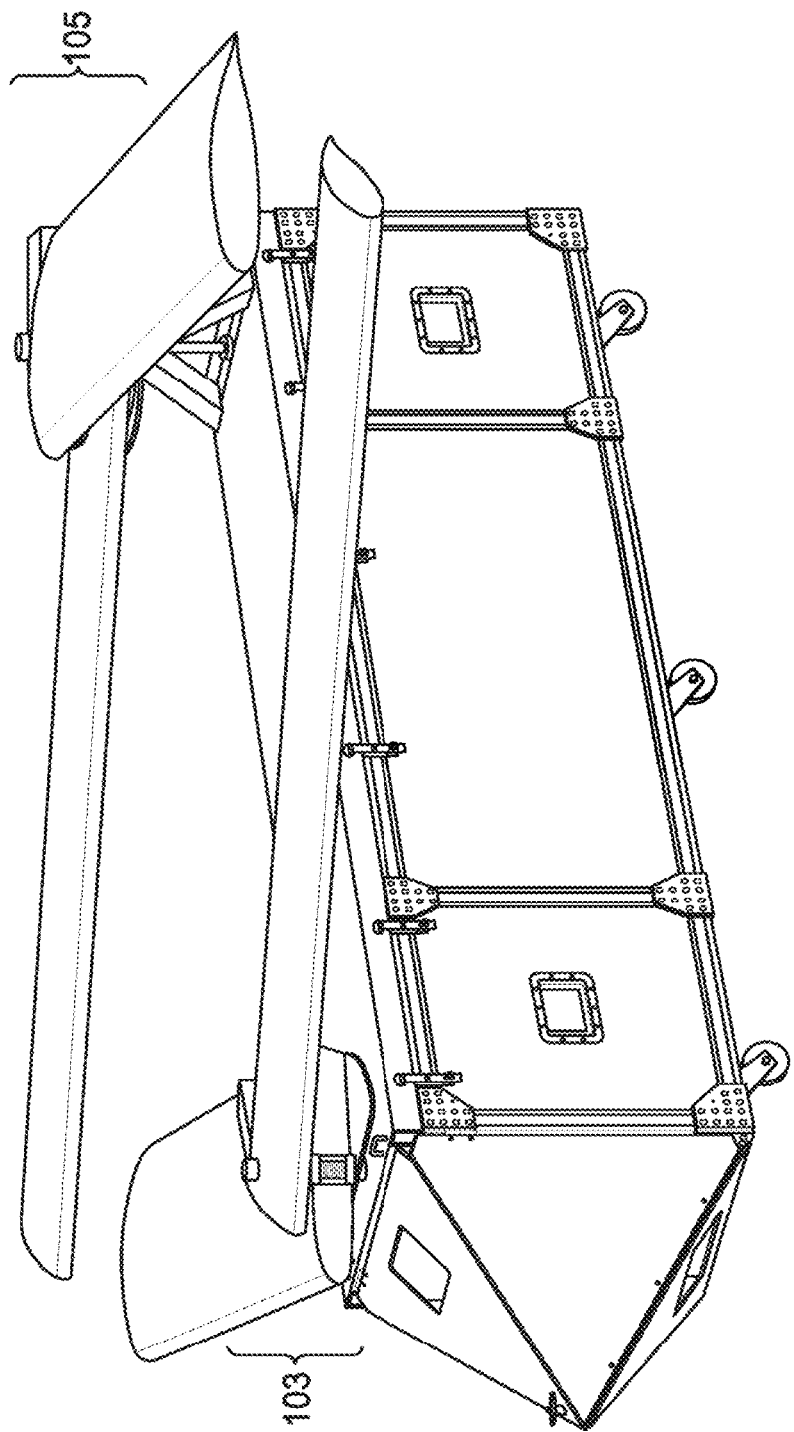
FIG. 14 is an exemplary embodiment of the UAV of the present invention with front and rear wings shown in in a more partially deployed position.
Figure 15:
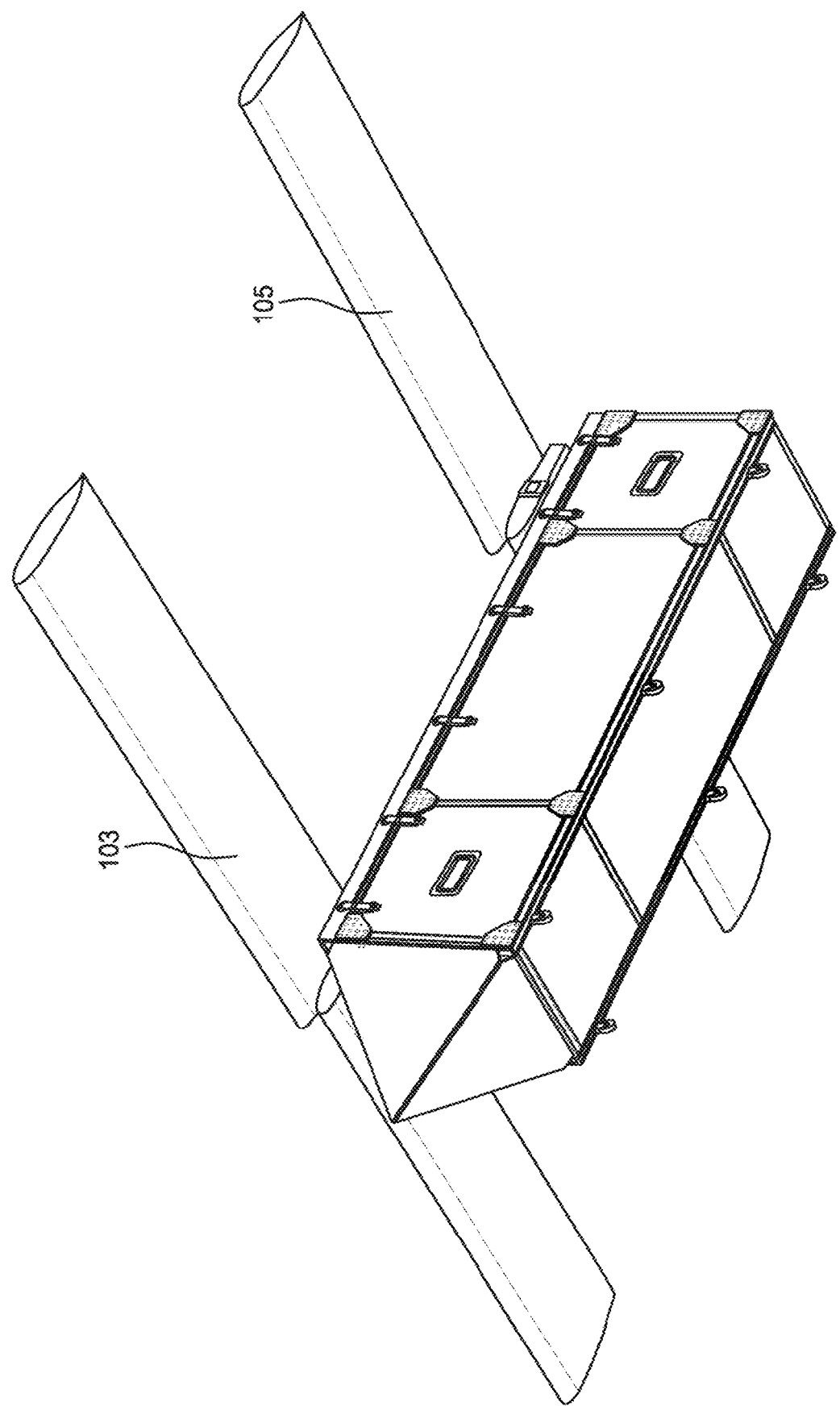
FIG. 15 is an exemplary embodiment of the UAV of the present invention with front and rear wings shown in the fully deployed position and with the aircraft in flying orientation.

As illustrated in FIGS. 13-15, the wings 103 and 105 of the front and rear pivoting wing systems 203 and 205 are configured to rotate between a stowed position and a deployed position.

FIG. 13 is a view of the UAV of the present invention with front wings 103 and rear wings 105 shown in a partially deployed position while being rotated by spring force during a deployment sequence.

FIG. 14 is a view of the UAV of the present invention with front wings 103 and rear wings 105 shown in a partially deployed position closer to being fully opened while being rotated by spring force during a deployment sequence.

FIG. 15 is an exemplary embodiment of the UAV of the present invention with front wings 103 and rear wings 105 shown in the fully deployed position and with the aircraft in flying orientation.

Figure 16A:
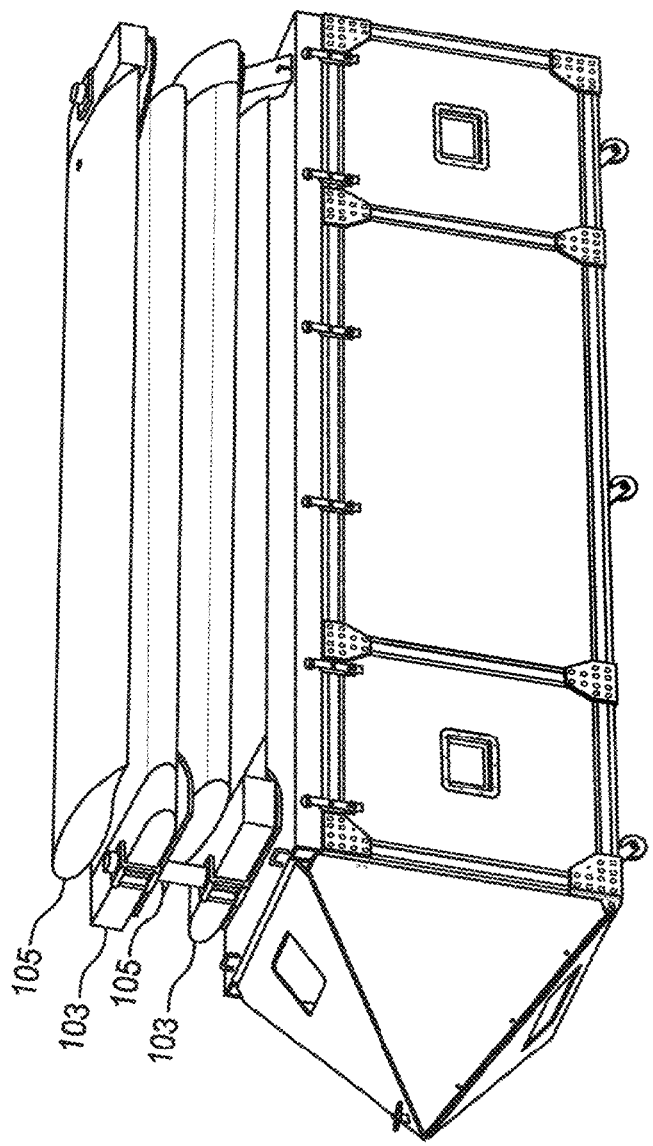
FIGS. 16A and 16B illustrate an exemplary embodiment of the UAV of the present invention with an alternate wing stack order.
Figure 16B:
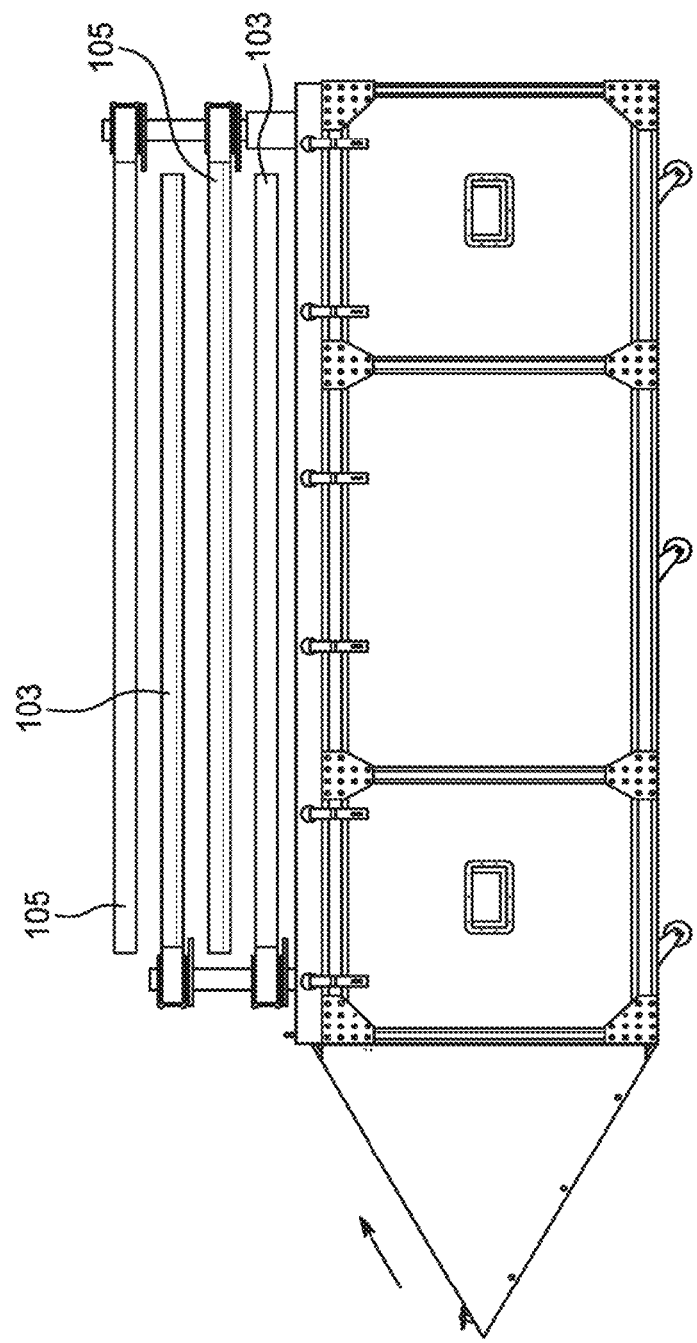

FIGS. 16A and 16B illustrate an exemplary embodiment of the UAV of the present invention with an alternate wing stack order. In one embodiment, the wings may alternate in the stack between front and rear wings. In an exemplary embodiment, the two wings 103 of the first pivoting wing system 203 are vertically spaced at different elevations relative to the two wings 105 of the second pivoting wing system 205. For example, the lowest wing may be a front wing 103, then the next wing is a rear wing 105, followed by a front wing 103 and finally a rear wing 105 is the top wing in this figure. The advantage of this alternating stack is that the lowest front wing 103 is adjacent to a rear wing 105 which allows a diagonally placed extension spring to tie the two wings together for a very efficient and high force wing opening arrangement. Accordingly, the upper two wings are similarly connected by a second extension spring that acts to pull both towards their respective open positions simultaneously as is illustrated with more particularity in FIGS. 18-21.

Figure 17:
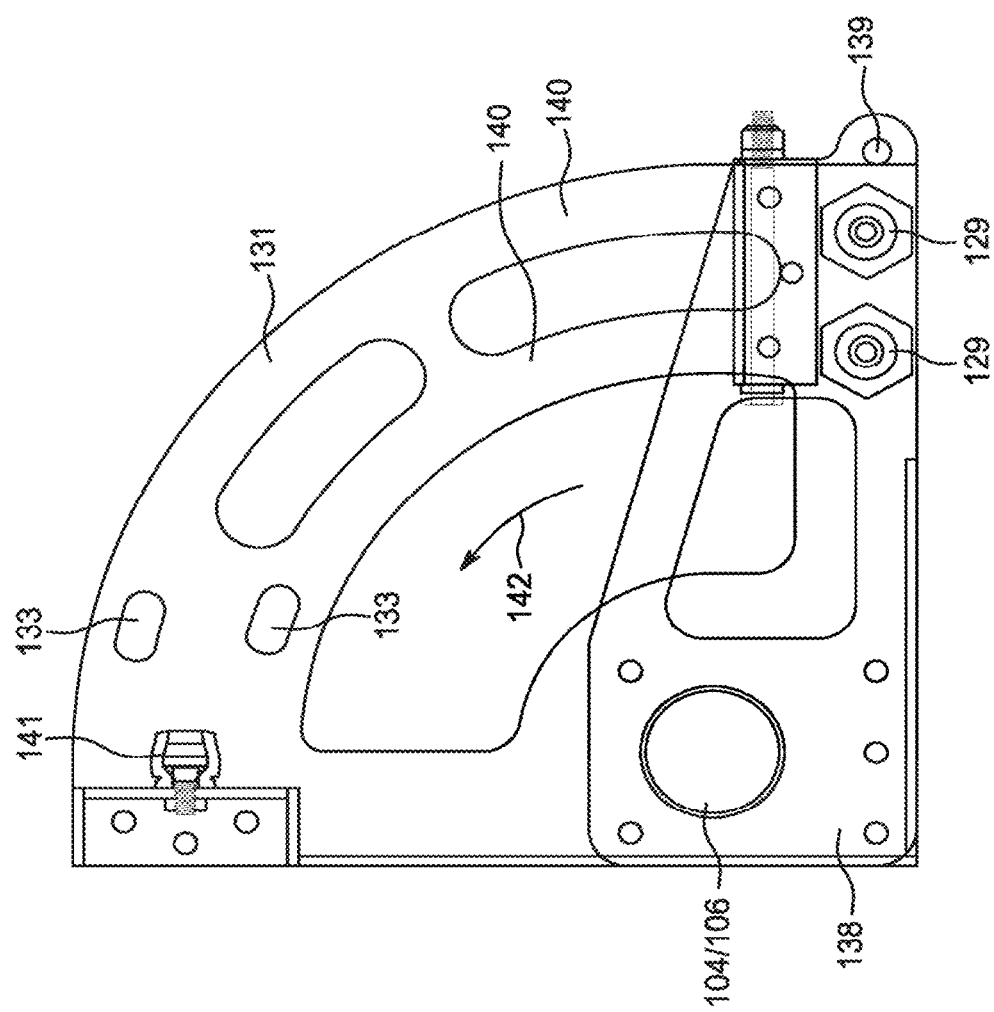
FIG. 17 is an exemplary embodiment of the UAV of the present invention with an alternate wing deployment mechanism.

FIG. 17 is an exemplary embodiment of the UAV of the present invention with an alternate wing deployment mechanism. A pivot arm 138 with a spring mount 139 is rotatably mounted to the front shaft 104 and similarly to the rear shaft 106. The pivot arm connects to its respective wing and provides the mechanical leverage and mechanism needed to open such wing during deployment and also to maintain such wing in both the stowed and deployed position depending on the state of the deployment operation. The pivot arm 138 rotatably engages a lock plate 131, which in turn is rigidly mounted to the front shaft 104 and similarly to the rear shaft 106 such as by welding, pin or bolt. The pivot arm 138 features one or more spring-loaded plungers 129 (shown here in a wing stowed position) which travel along a raceway 140 during the wing deployment sequence towards deployed holes 133 that receive the spring-loaded plungers 129 and lock the wing in the deployed position, which in one embodiment is 90 degrees from the stowed position. Due to the significant spring force required to open the wings and the corresponding rotational inertia of the wings in motion along the direction of the wing deployment arrow 142, an optional compression spring 141 may be used to slow or stop the wing's opening motion in a controlled fashion. The compression spring 141 may be a damper, a snubber, a rubber device, bumper or steel spring. The deployed holes 133 may be shaped as ovals rather than as circles to allow the spring plungers to rotate past their ideal deployed position as the compression spring compresses to absorb the wing opening energy and then causes the spring-loaded plungers 129 to be moved back to their ideal and locked positions. The use of spring-loaded plungers 129 is not meant to be limiting. A person skilled in the art of mechanical engineering may alternately use latches, pins and other such mechanisms to release and then lock the wings between stowed and deployed positions without departing from the spirit of the present invention.

Figure 18A:
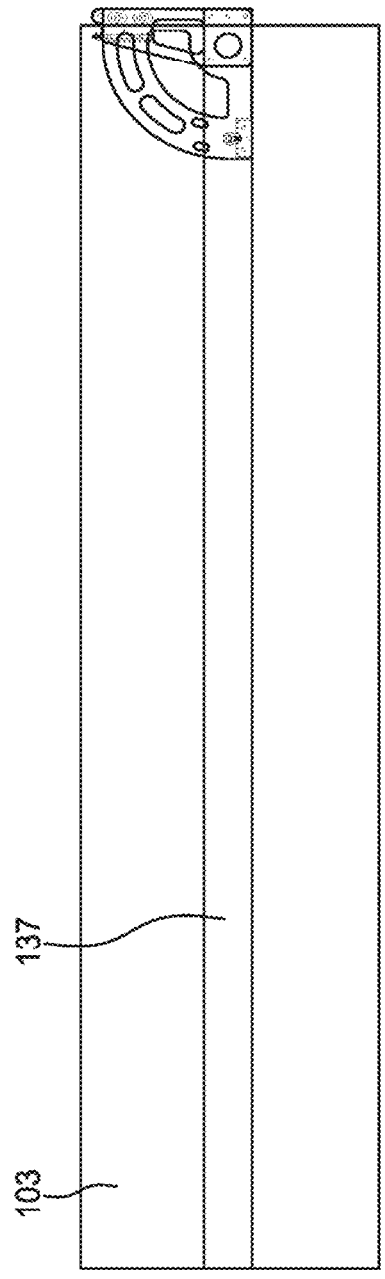
FIGS. 18A-18B illustrate an exemplary embodiment of the UAV of the present invention with one front wing and one rear wing shown opposing each other to illustrate a diagonal extension spring deployment embodiment.
Figure 18B:
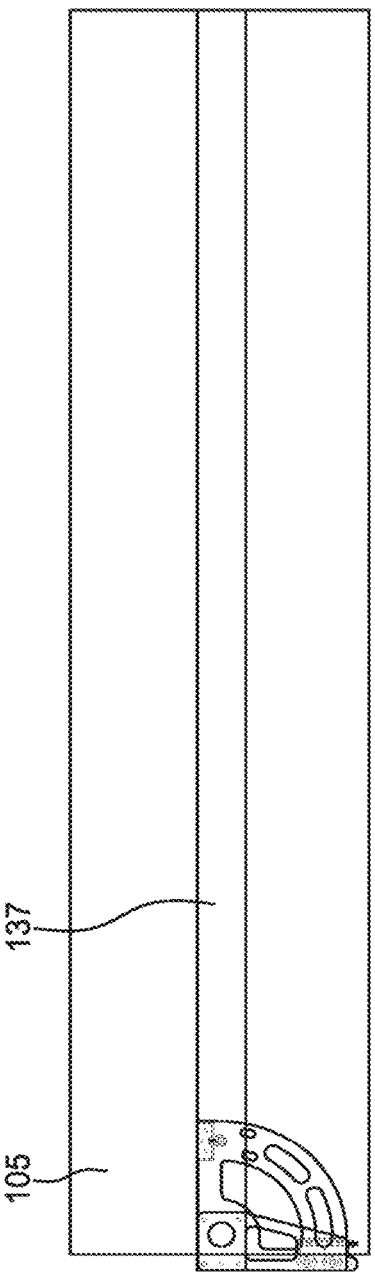

FIGS. 18A-18B illustrate a view of the UAV of the present invention with one front wing 103 and one rear wing 105 shown opposing each other to illustrate a diagonal extension spring deployment embodiment. The wing spar 137 of each of the two example wings can be seen for illustrative purposes.

Figure 19:
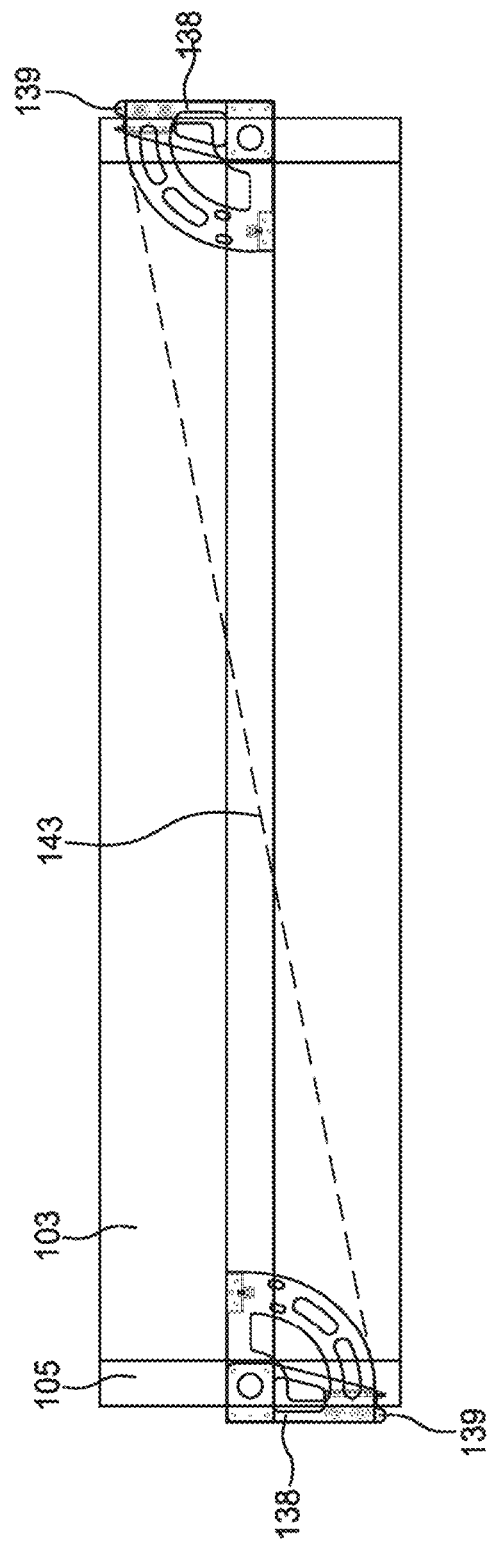
FIG. 19 is an exemplary embodiment of the UAV of the present invention with the one front wing and one rear wing shown partially overlapping each other as they would when installed in their respective stowed positions on the lid to illustrate a diagonal extension spring deployment embodiment.

FIG. 19 is a view of the one front wing 103 and one rear wing 105 shown partially overlapping each other as they would when installed in their respective stowed positions on the lid 102 (not shown) to illustrate a diagonal extension spring deployment embodiment. A hidden line represents a diagonally installed extension spring 143 that is connected to the spring mount 139 holes of each wing's pivot arm 138. From this view it can be appreciated that the extension spring 143 which is fully extended, is extracting an equal force of potential energy on the pivot arms 138 of both wings that is biased towards pulling both wings open by pivoting around their respective shafts.

Figure 20:
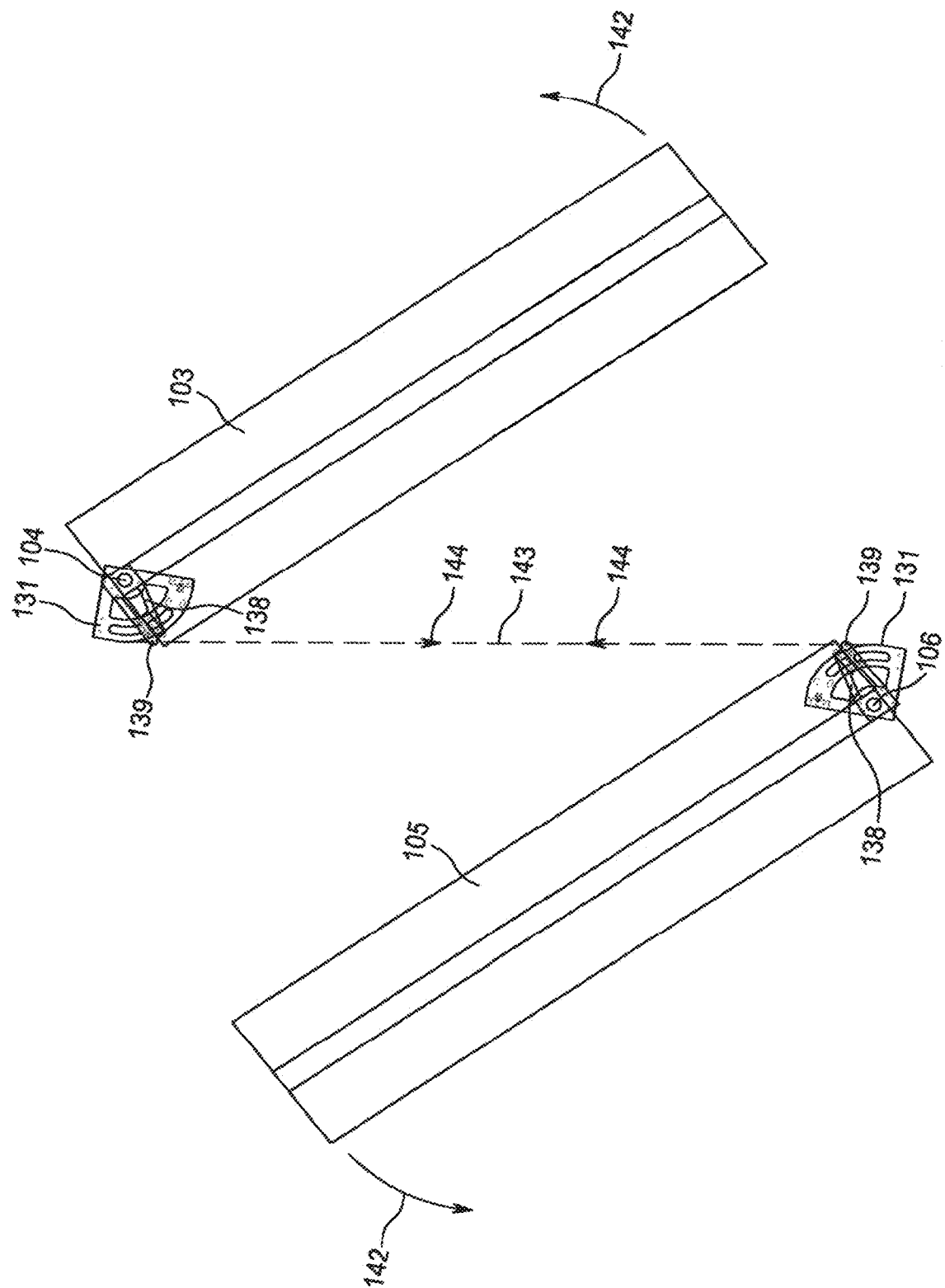
FIG. 20 is an exemplary embodiment of the UAV of the present invention with the one front wing and one rear wing shown partially deployed to illustrate a diagonal extension spring deployment embodiment.

FIG. 20 is a top view of the UAV of the present invention with the one front wing 103 and one rear wing 105 shown partially deployed to illustrate a diagonal extension spring deployment embodiment. It can be seen that the lock plates 131 remain fixed to the respective shafts while the pivot arms 138 are rotating from a stowed position to a deployed position and in this FIG. 20 are shown halfway between such positions for illustrative purposes. The potential energy of the extension spring 143 is shown acting in the direction of spring force direction arrows 144 to open both wings simultaneously as it contracts from its fully extended state to its relaxed spring state by pulling on the spring mounts 139 of each wing's pivot arm 138. Wing deployment arrows 142 show the equal and opposite wing deployment based on this unique extension spring mechanism and arrangement as the front wing 103 pivots around front shaft 104 and rear wing 105 pivots around rear shaft 106.

Figure 21:
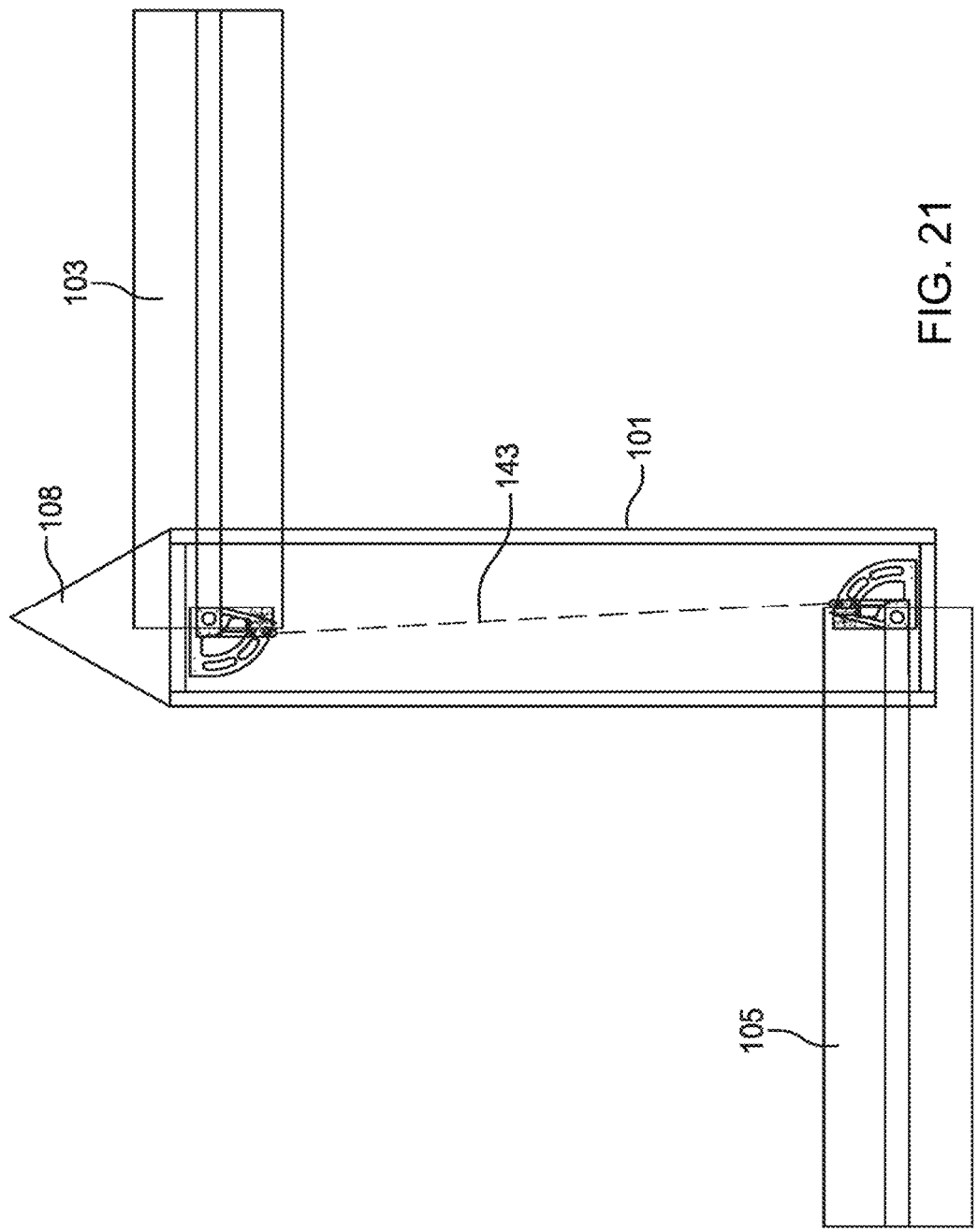
FIG. 21 is an exemplary embodiment of the UAV of the present invention with the one front wing and one rear wing shown fully deployed in their respective positions on the lid to illustrate a diagonal extension spring deployment embodiment and the fuselage and nosecone are included to provide context.

FIG. 21 is an exemplary embodiment of the UAV of the present invention with the one front wing 103 and one rear wing 105 shown fully deployed in their respective positions on the lid 102 (not shown) to illustrate a diagonal extension spring 143 deployment embodiment and the fuselage 101 and nosecone 108 are included in this figure to provide orientational context. Although most of the potential energy of the extension spring 143 has been used to open both wings simultaneously during the deployment sequence, it may be desirable to install the extension spring 143 such that a slight amount of potential energy remains in order to provide a constant spring force holding the wings in position and assisting the locking mechanism in such location.

Figure 22:
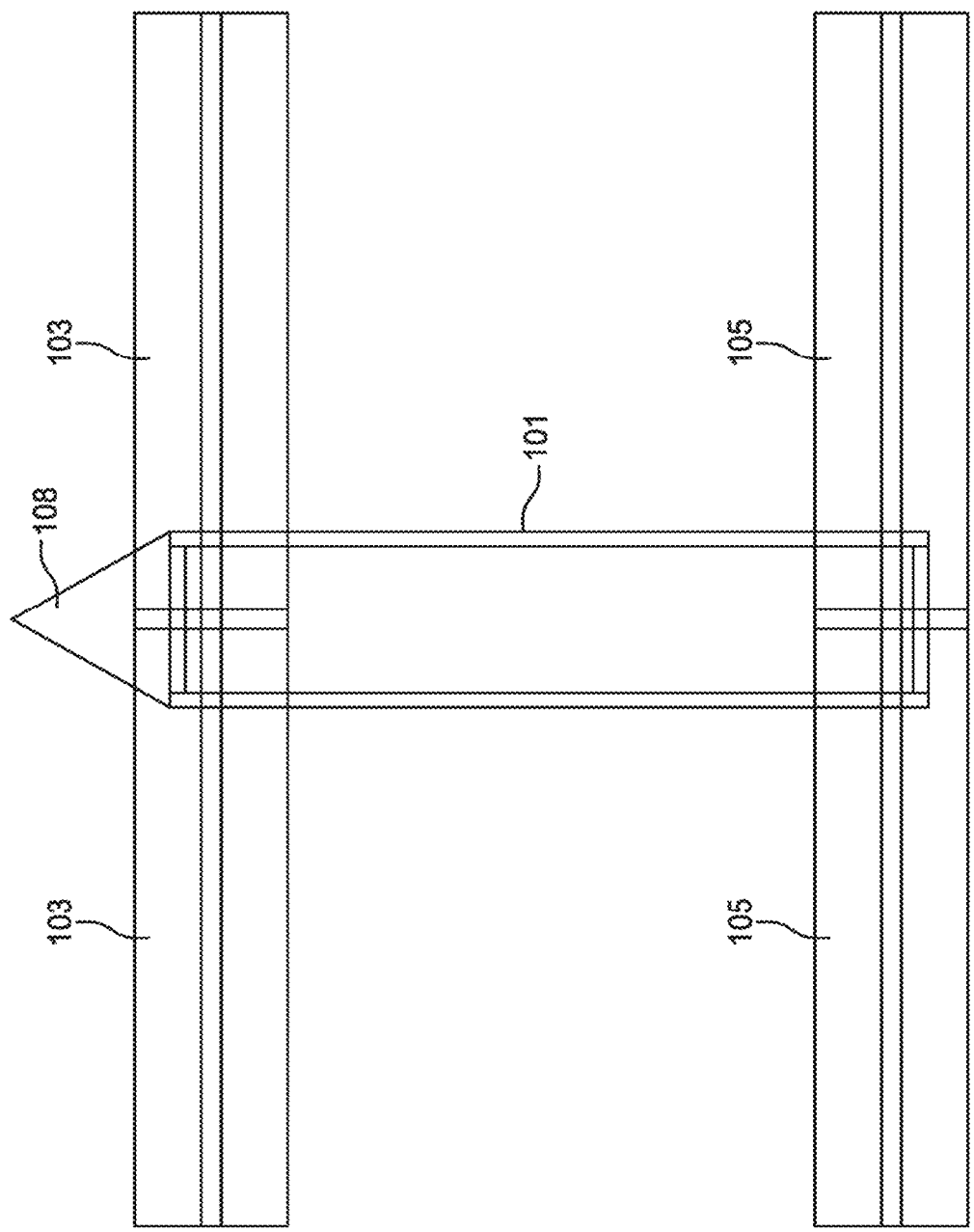
FIG. 22 is an exemplary embodiment of the UAV of the present invention with two front wings and two rear wings shown fully deployed in their respective positions on the lid to illustrate the top view of the aircraft in flying condition.

FIG. 22 is a top view of the UAV of the present invention with two front wings 103 and two rear wings 105 shown fully deployed in their respective positions on the lid 102 (not shown) to illustrate the top view of the aircraft in flying condition. Fuselage 101 and nosecone 108 are included in this figure to provide orientational context.

Figure 23A:
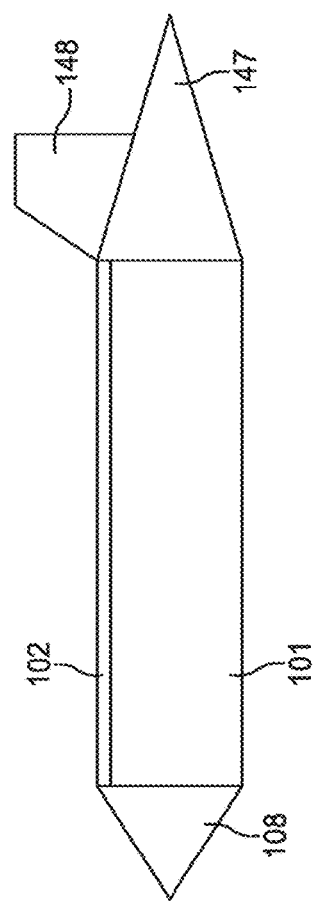
FIGS. 23A-23C are a series of three side views of the UAV with alternate tail treatments.
Figure 23B:
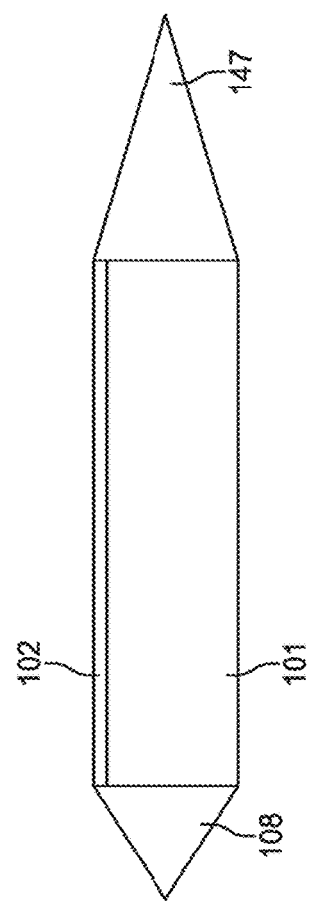
Figure 23C:
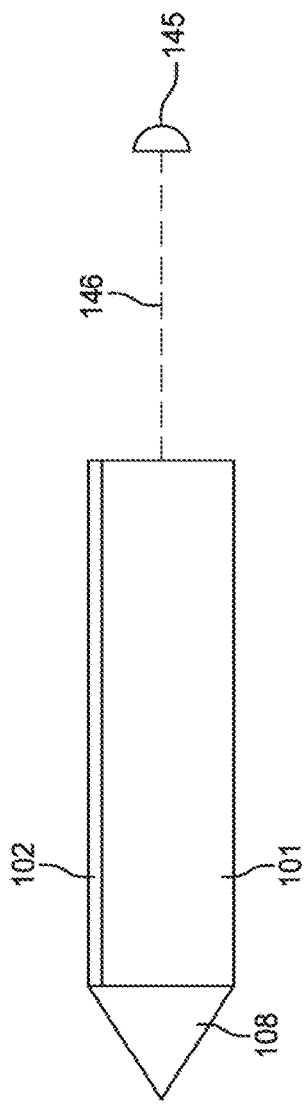

FIGS. 23A-23C are a series of three side views of the UAV illustrating the fuselage 101, lid 102, nosecone 108 and an optional trailing parachute 145 that may be connected to fuselage 101 by one or more canopy lines 146. The parachute may be a drogue chute that is pulled along during the flight of the UAV and is sized by a person practicing the present invention to create the minimal drag force necessary to keep the UAV under adequate longitudinal control to prevent departure from controller flight. In one embodiment, parachute 145 may be 9 inches in diameter. Several major advantages of the use of parachute 145 include the elimination of the cost, complexity, size, weight and expense of a vertical tail and rudder. One disadvantage of parachute 145 is the addition of parasitic drag, which reduces the glide ratio of the UAV. An optional tail cone 147 may be used to reduce parasitic drag at the rear of the aircraft. The tail cone may be constructed from a series of triangular flat panels to make storage and assembly simple in the field. Alternately, the tail cone 147 may be rounded or have compound curves and shapes for aerodynamic efficiency. The tail cone may be hinged and assembled by a series of pins like the nosecone of the present invention as described and illustrated in FIGS. 5, 7, 8 and 9. The tail cone may include mounting provisions for a vertical tail 148 or a vertical tail may be integral to the tail cone for simplicity and part reduction purposes. The tail cone 148 facilitates longitudinal stability and can be used instead of parachute 145 by a person practicing the present invention who desires to maximize aerodynamic efficiency and glide ratio.

Figure 24:
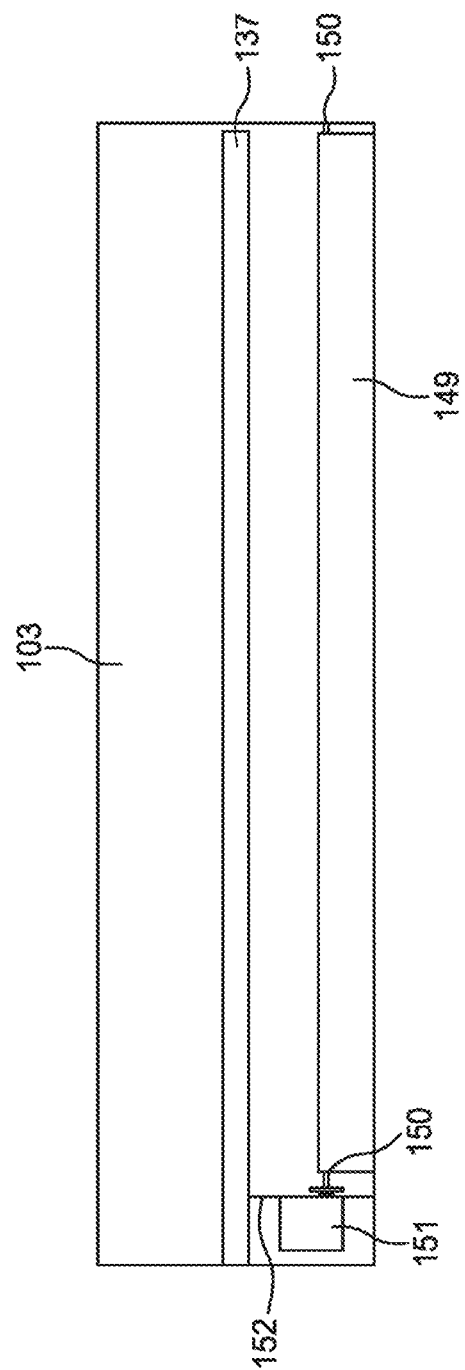
FIG. 24 is a top view of one wing of the UAV to illustrate a flight control surface connected to a flight control actuator.

FIG. 24 is a top view of one wing of the UAV such as front wing 103. A wing spar 137 is shown for illustrative purposes. One or more flight control surfaces 149 may be integrated or attached to wing 103 and configured as an aileron, elevator, flap, spoileron, or combination of flight control surfaces known to those skilled in the art of aircraft control. The control surface 149 may be pivotably connected to wing 103 by one or more pivots or aileron hinges 150. A flight control actuator 151 may be connected to flight control surface 149 directly, or via linkage. The flight control actuator 151 may be mounted to a wing rib 152.

Figure 25:
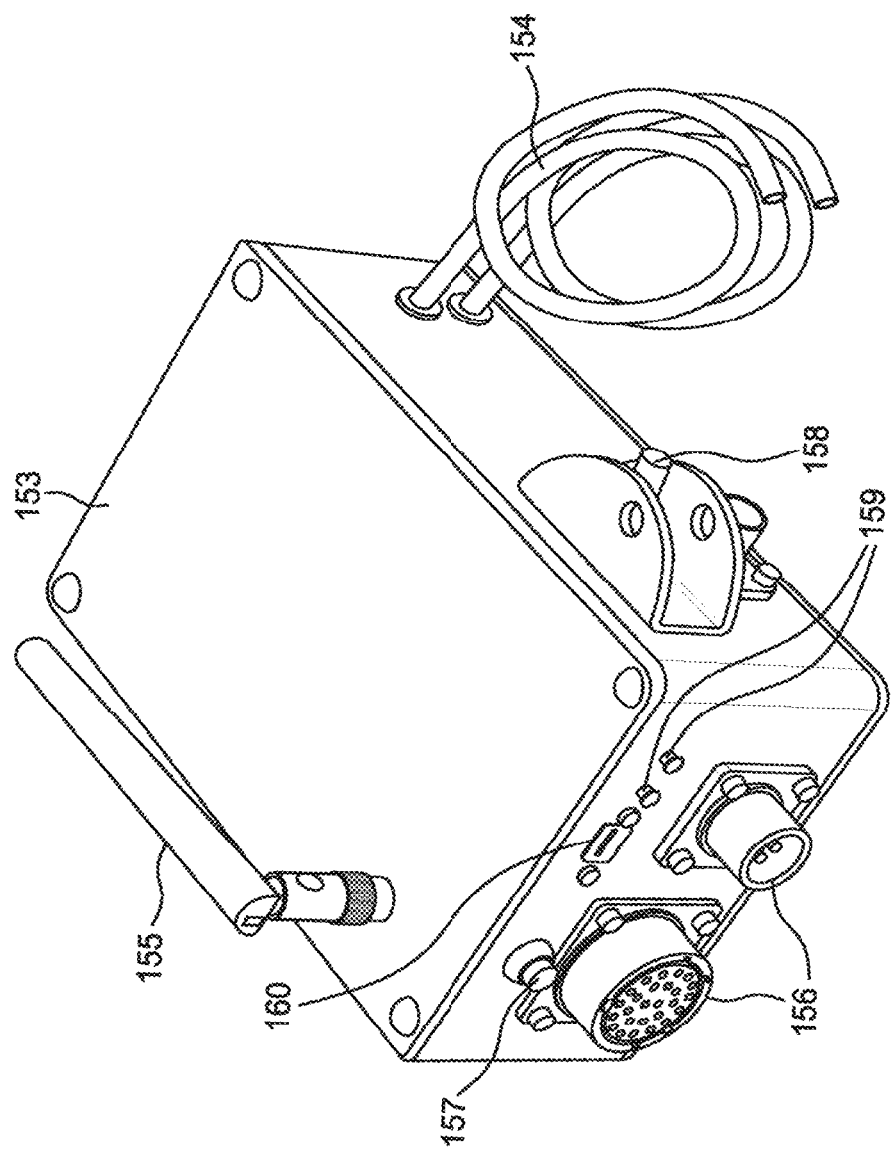
FIG. 25 is an exemplary control system used as an autopilot for the UAV.

FIG. 25 is an exemplary control system 153 used as an autopilot for the UAV. The control system 153 can be a controller. In embodiments, control system 153 is a guidance system. Control system 153 may include such features as pitot static tubes 154, one or more antenna 155 such as for remote flight control or telemetry, electrical connectors 156 such as to connect the control system 153 to one or more flight control actuators 151 (not shown). Additionally, mode selection buttons 157, an on/off switch 158, status lights 159, and communication ports 160 may be included as part of the control system 153.

Figure 26:
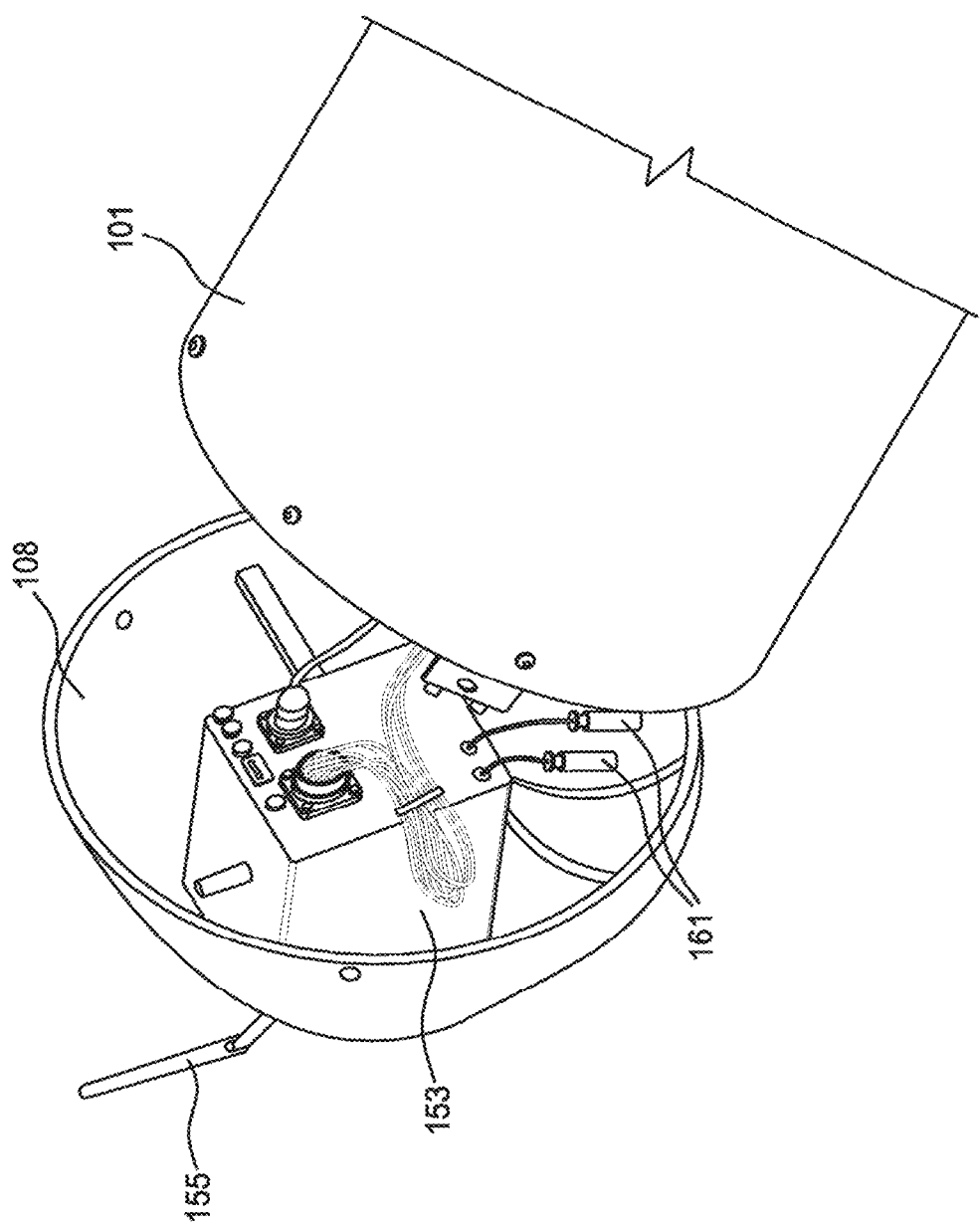
FIG. 26 is an alternate embodiment with a cylindrical fuselage and nosecone, showing an exemplary placement of a control system and batteries in the nosecone of the UAV.

FIG. 26 is an alternate embodiment with a cylindrical fuselage 101 and nosecone 108, showing an exemplary placement of a control system 153 and one or more batteries 161 located in the nosecone of the UAV. Alternately, the control system 153 and batteries 161 may be located in the lid 102 (not shown) or in one or more wings of the UAV. They may also be located in the fuselage or tail cone of the UAV.

The fuselage 101 can be used for carrying a payload of cargo or supplies. The fuselage is illustrated as a substantially rectangular cross section, however, the shape of the fuselage is not limited and for example may be a cylinder or other shape. In alternative embodiments the fuselage can have an irregularly shaped cross section. In yet alternative embodiments the fuselage can have a square cross section. The fuselage can be designed to carry any number of supply. The fuselage can be designed to carry food or medicine. The fuselage can be designed to carry tools or ammunition. The fuselage can also be designed to carry various mechanical and/or electronic equipment. The type of electronic equipment is not limited, examples may include sensors, cameras, radios, batteries or portable electronics. The fuselage can be designed to carry fluid. For example, the fuselage can be designed to carry water or fuel. In exemplary embodiments the fuselage can also be designed to carry chemicals or hazardous materials.

The fuselage can be formed of any durable material. In exemplary embodiments the fuselage is made of metal or metal alloy, wood and foam. In exemplary embodiments the fuselage can be made of aluminum (Al). In alternative embodiments, the fuselage can be made of plastic. In yet alternative embodiments, the fuselage can be made of fiberglass. The fuselage can alternatively be made of wood. In exemplary embodiments, the fuselage may also be formed using any combination of the above identified materials. In preferred embodiments, the fuselage is made of a light weight material. For example, a preferred embodiment can include a fuselage made of plywood and foam sandwich panels mounted within an aluminum structure.

The fuselage can be equipped with any necessary equipment for the safe storage of the supply. For example, the fuselage can be equipped with impact foam or other padding. In alternative embodiments, the fuselage can be equipped with temperature controlled system that is able to maintain the payload at a set temperature. The fuselage can be equipped with insulation. The inside of the fuselage can be equipped with one or more braces that can clamp the payload and tightly secure it in a desired manner. In exemplary embodiments, the inside of the fuselage can also be compartmentalized such as with cargo bulkhead panels.

In an exemplary embodiment the UAV can carry a supply load of up to 700 lb. in the fuselage. In one embodiment, the supply load can be contained inside a fuselage that is 2 feet by 2 feet by 8 feet. The supply load can be protected and suspended in high impact foam located inside the fuselage.

In exemplary embodiments the fuselage can be made to separate from the UAV and be used as a portable storage device. The fuselage can be equipped with features to ease its transport. The fuselage can be equipped with one or more handles. The fuselage can also be equipped with wheels. The wheels can be retractable so as to prevent damage during landing of the UAV. The wheels can also be fixed. Alternatively, the fuselage can be designed to be repurposed as a storage box. After landing, the fuselage can be easily separated from the lid and wings and nose cone for ease of transport of the supply without necessitating the carrying of any other portion of the UAV.

The pivoting wing systems can have any suitable wingspan. In exemplary embodiments the wingspan of the front wing system having wings 103 can be 14 feet and the wingspan of the rear wing system having wings 105 can similarly be 14 feet, giving an effective wingspan of 28 feet for maximum gliding capability of the 2'×2'×8' fuselage 101 form factor. In alternative embodiments the wingspan of either pivoting wing system can independently be anywhere between one inch and 50 feet. For example, the wingspan can be 1 in, 6 in, 1 ft, 5 ft, 10 ft, 15 ft, 20 ft, 25 ft, 30 ft, 35 ft, 40 ft, 45 ft, or 50 ft. These are just exemplary sizes. The size of the wingspan will depend on the overall size of the UAV, the payload weight it must carry and the desired glide ratio, among other factors. In exemplary embodiments the one or more wings of the wing systems can include an airfoil design. In preferred embodiments, the airfoil design is a National Advisory Committee For Aeronautics ("NACA") 4309 with a 3 ft chord. However, other designs, including designs generally known as NACA or NASA airfoils, may also be used. The one or more wings that are part of the front and rear wing systems 203 and 205 can also include one or more flight control actuators.

The one or more wings of the front and rear wing systems can include wing control surfaces 149 configured to control the aircraft in yaw (as in a flying wing design). For example, the one or more flight control actuators can be used to control flight control surfaces such as flaps, spoilers, and/or ailerons that can be part of the one or more wings of the wing systems. The flight actuators can be electric actuators. Alternatively, the flight actuators can be pneumatic. In one pneumatic actuator embodiment, the fuselage may be designed to be airtight, and after the payload is placed inside the fuselage, the fuselage may be pressurized with compressed air or other gas, which may then be used in flight to provide pressure to the pneumatic actuators for flight control. This unusual control strategy is workable in the present invention, because of the very short duration flight times starting from the time of jettison at altitude all the way to the landing phase on the ground, which in exemplary cases gives a total flight time for the aircraft of approximately 10-20 minutes. In alternative embodiments the actuators can be hydraulic actuators. The actuators can be controlled by the on-board automatic flight guidance system. Alternatively, the actuators can be designed to receive commands from a remote operator. The connection to between the actuators and the on-board flight guidance system can be either wireless or by use of cables such as USB, Ethernet, fiberoptics and the like. Wireless connection can be radio, wi-fi, or similar method. The remote control signals can also be transmitted by way of any suitable wireless communication, including radio signals.

Use of ailerons can avoid the need for a vertical stabilizer or rudder to control yaw. In an exemplary embodiment the wing systems 203 and 205 include at least two wings. Each wing can have an independently operable flight controls as illustrated in FIG. 24. For example each wing can have an independently operable aileron. Each wing can also have an independently operable spoileron or flap. Controlling of the flight control actuators and thus of the ailerons, spoilerons or flaps can be performed either by remote control or can be accomplished via a controller 153 and control actuators 151 located on board of the UAV. In exemplary embodiments the controller can determine the operation of the flight control actuators based on information such as global positioning system (GPS), altitude, desired destination, weather conditions, other flight conditions and the like. A more detailed description of the control equipment is provided later in this specification. As illustrated in FIG. 23C, use of a small drogue parachute 145 trailing along behind the flying UAV can also be used to obviate the need for a vertical tail or rudder by creating sufficient longitudinal drag to maintain the aircraft's orientation.

The flight control actuators and the control equipment on board the UAV can be powered by a power source. The power source can be one or more batteries 161. The one or more batteries can be stored anywhere on the UAV. In exemplary embodiments the batteries are also located inside the one or more wings of the wing systems. Each wing may have its own battery supply for redundant actuator operations. In alternative embodiments the one or more batteries can be stored in the fuselage. In the alternative, the one or more batteries 161 can be located in the nose cone as illustrated in FIG. 26. Alternative power source to a battery can be a capacitor. A capacitor may be stored in similar locations described above for the batteries. Other similar power storage devices can also be employed. The storage device, be a battery, capacitor or other structure can be rechargeable.

The wings of the wing systems may be made of any suitable material. In exemplary embodiments the wings are made of metal. For example, the wings can be made of aluminum. In alternative embodiments the wings can be made of plastic. In yet alternative embodiments the wings may be made of fiberglass. In exemplary embodiments the wings can also be made of wood. In preferred embodiments the wings are made of the same material as the fuselage. However, this is not required. In exemplary embodiments the wings may be made of a material different from that used for the fuselage. Also, in exemplary embodiments, the wings can be made of a combination of the above identified materials. In a preferred embodiment the wings can be made of a foam core, metal structure and heat-shrink plastic wing skins. In other embodiments, the wing spar and rib structure may be injection molded or cast and then covered by sheet metal, fiberglass, carbon fiber, balsa wood or fabrics. The wing structure may be a resin impregnated wood material that is known to be strong but also biodegradable.

The wings can be of any suitable shape. In exemplary embodiments, the wings of the wing systems have a rectangular shape. In alternative embodiments the wings of the wing systems have a tapered shape.

The wings may also include a shear failure point. In exemplary embodiments, the wings can break off during landing to further absorb the impact. In alternative embodiments, the wings can be made to break off during, or even after landing to make the UAV easier to carry.

At the front end of the fuselage is a nose cone 108. The nose cone 108 is illustrated in the shape of a four-sided pyramid, however, this shape is not limited. Notwithstanding the nomenclature used herein, the nose cone can be in a shape other than a cone. In exemplary embodiments the nose cone has a generally circular cross section with a convex, rounded front end. Alternatively, the nose cone can have a flat front end. Exemplary embodiments may include a nose cone with a concave front end. Also, the nose cone can have a non-circular cross-section. For example, the nose cone could have a square, rectangular or irregularly shaped cross section. Preferred embodiments include a nose cone that has an aerodynamic shape. In exemplary embodiments, the cross-sectional shape of the nose cone will mimic the cross-sectional shape of the fuselage. In alternative embodiments, the nose cone will have a different cross-sectional shape that is different from the cross-sectional shape of the fuselage. As illustrated in FIGS. 23A-23B, a tail cone 147 may be fitted to the rear of the fuselage to reduce drag in the same manner as the nosecone is attached to the front of the fuselage. The tail cone 147 may have a vertical tail protruding from the top surface. The tail cone may be rigid or inflatable. A scoop may ram air into the tail cone to keep it inflated during flight. A series of spring steel wires may hold open a flexible tail cone to its intended shape.

The nose cone can be integral to the fuselage or be detachable. In exemplary embodiments where the nose cone is integral to the fuselage, the nose cone constitutes the front end of the fuselage and can be formed either of a contiguous material as the fuselage or can be separately manufactured but permanently attached to the fuselage. In alternative embodiments, the nose cone can be designed to be detachable from the fuselage. The nose cone can be made of any material used to form the fuselage. For example, the nose cone can be metal, wood, fiberglass, or plastic. In exemplary embodiments the nose cone is made of aluminum or wood. The nose cone can be made to match the material as the fuselage. In alternative embodiments, the nose cone is made of a material that is different from that of the fuselage. Likewise, a detachable nose cone can be similarly detached from the fuselage in any of the previously described manners in which the fuselage can be detached from the cargo hold either manually or by automation or remote control.

The nose cone can provide additional storage capacity. In exemplary embodiments, the nose cone can provide a storage space separate from that of the fuselage. In alternative embodiments, the nose cone can provide a storage space that is contiguous to that of the fuselage. The nose cone can also be equipped with an access door or be detachable from the fuselage so as to provide access to a storage box located inside the fuselage. In this manner the storage box can be easily removed from the fuselage from the front of the UAV. The nose cone can also be used to store electronics components to the UAV such as GPS, controllers, one or more transmitters, memory, power sources such as batteries and the like. In an exemplary embodiments as illustrated in FIG. 26, the nose cone is used to carry the control system as well as other controllers including GPS, one or more transmitters, a memory, and one or more power sources for the UAV. In exemplary embodiments, the nose cone can be designed to bear the impact of landing by including padding or crush foam sufficient to protect the supplies stored in the fuselage or elsewhere in the rest of the UAV.

The UAV can include a guidance system 153. In exemplary embodiments, the guidance system can be an on-board autonomous system. Alternatively, the guidance system can be controlled via remote control. For example, the UAV may include a radio-controlled guidance system. In exemplary embodiments, the UAV may include a combination of remote controlled and autonomous guidance system 153 as illustrated for example in FIG. 25. In one embodiment, the UAV can include an on-board autonomous guidance system that can a user can override via radio control. Such autonomous control systems typically comprise hardware and software elements. The hardware of such systems is becoming known in the art of UAV guidance such as manufactured by 3D Robotics of San Diego, California. Autonomous control software is becoming known in the art of UAV guidance and may be installed as firmware on various hardware platforms. One example of autonomous UAV firmware is APM:Plane provided by 3D Robotics, which is open source and thus can be easily customized for different unmanned aircraft configurations and missions. A mission planning software tool may be used to pre-program the autonomous autopilot with coordinates and altitudes for a particular mission. One example of such mission planning software is Mission Planner Ground Control Station software provided by 3D Robotics.

An on-board autonomous guidance system may include autopilot flight controls. The on-board autonomous guidance system can receive information regarding the jettison or deployment location, the altitude at which the UA Vis jettisoned, and the intended landing location. In addition to the location, the information may also include the altitude of the landing location. The landing altitude, however, is not strictly needed since it can also be determined from a terrain database or determined by an onboard ground proximity sensing system such as a remote sensing technology that measures distance by illuminating a target with a laser and analyzing the reflected light, for example a Light Detection and Ranging system (LIDAR), laser altimeter, range finder, sonar sensor, infrared sensor, or a length of wire hanging below the fuselage of the UAV during flight with a sensor at the distal end of the wire configured to make first contact with the ground and transmit a triggering signal.

The information can be uploaded prior to jettisoning the UAV. In exemplary embodiments, the information may be uploaded by way of wireless telemetry, USB cable, Ethernet cable, fiberoptic cable, radio transmission, wi-fi connection, or by physical connection or insertion of a memory device in or to the UAV. Alternatively, the information may be provided or updated during deployment of the UAV, i.e. after the UAV has been jettisoned. Any suitable wireless communication can be used to transmit the data to the UAV guidance system whether it is to actively control the UAV or to feed information to the on-board autonomous guidance control system. In alternative embodiments, the on-board autonomous guidance system can be designed to determine the location and altitude of the UAV autonomously. In such exemplary embodiment, the only information to feed to the on-board autonomous guidance system is the landing location. In addition to the landing location, the information may also include the altitude of the landing location. Although, the altitude of the landing location can be also determined through other means described above, such as ground proximity sensing system or a terrain database. This information can be provided either before or after the UAV is jettisoned. The information fed to the on-board autonomous guidance system can be provided either by an operator or by a main frame or separate controller unit. Information about weather conditions including, for example, wind speed and wind direction can also be provided or sensed in real-time by on-board sensors such as an airspeed sensor compared to a second velocity sensor such as GPS with a function of the difference in speed measurements representing the approximate winds aloft direction and velocity.

The guidance control system 153 of exemplary UAVs may include global position system (GPS) waypoint navigation. The control system 153 may include inertial measurement units that provide attitude information for aircraft, including heading, pitch, yaw, and roll. Exemplary embodiments include mechanical gyroscopic flight instruments. Preferred embodiments include an attitude and heading reference system (AHRS). AHRS can include either solid-state or microelectromechanical systems (MEMS) gyroscopes, accelerometers and magnetometers on all three axes. In exemplary embodiments, the guidance control system 153 can include 6 degrees of freedom (DOF) AHRS. The guidance control system 153 can also include a pitot-static system that can be used to determine an aircraft's airspeed, Mach number, altitude, and altitude trend. The guidance control system can also include a magnetic compass. The control system can include a barometric pressure altimeter. As described earlier, the control system can include a LIDAR laser altimeter. The control system can also include customizable autoland routines. The control system can also include an automatic stall prevention code. The control system can further include differential aileron algorithms. The control system can include failsafe modes. The control system can also include user configurable firmware. The control system can further be equipped with mission planning software.

The UAV can be jettisoned or deployed from either a stationary base or a moving craft. In exemplary embodiments, the UAV can be jettisoned or deployed from a moving aircraft (mothership). The mothership can be any aircraft that is capable of carrying and jettisoning the UAV. The mothership can be a manned aircraft. Alternatively, the mothership can itself be an unmanned aircraft. As an unmanned aircraft the mothership can either have its own autopilot or autonomous flight control system, or it can be controlled remotely. In exemplary embodiments, the mothership may be a combination of manned and unmanned type of aircraft and autonomous and remotely controlled aircraft. In an exemplary embodiment, the mothership can be a C-130 aircraft. Although other similar aircrafts can also be used. For example, CH-53 or MV-22 or any like aircraft. The UAV can be carried inside the mothership, for example in the cargo bay. In alternative embodiments, the UAV can be carried outside the mothership such as in a slingload configuration underneath a mothership such as a helicopter. The operator of the mothership can cause the slingload to release the UAV at a location and altitude where jettisoning is desirable. The slingload may comprise a cable or a net to hold the UAV. The cable may be released to jettison the UAV. In the case of a cargo net, the net may be released partially or completely from the mothership to cause the UAV to separate and fall away from the mothership at a predetermined location. In alternative embodiments, the UAV can be placed inside a tube inside or external to the mothership that acts to keep the wings of the wing systems folded and once ejected from the tube at the jettison location, the wings of the wing systems can have a spring loaded deployment feature that causes the wings of the wing systems to rotate into a locking position once free of the deployment tube.

In exemplary embodiments, the UAV described herein are expendable UAV (EUAV). EUAV can be designed for single deployment and can be produced very cost effectively.

In an exemplary embodiment, the EUAV can be loaded with up to 700 lbs of supply. The EUAV can include the payload contained in a 2 ft×2 ft×6 ft fuselage. At full gross weight, the glide ration can be 10:1 and give a standoff distance of 23-49 miles when jettisoned at altitudes of 12,000 and 25,000 feet, respectively.

The fuselage can also include provisions on its underbelly for forklift skids as well as numerous lifting eyes and cargo rings to provide for secure airborne transport to the drop zone. In exemplary embodiments the airframe can weigh 300 for the fuselage and wings, that together with a 700 lb supply load results in a max gross weight of 1,000 lbs.

Autonomous flight can be accomplished by a modified COTS fixed-wing autopilot. The landing routine can begin when the on-board LIDAR sensor detects terrain proximity approximately 150 ft AGL and begins slowing the EUAV craft, ultimately commanding all ailerons to their full down positions to act as spoiler/flaps followed by a pitch-up, full stall landing within 100 ft of the intended drop zone. The EUAV can achieve a vertical sink rate of 0 fpm at the point of touchdown.

Figure 27:
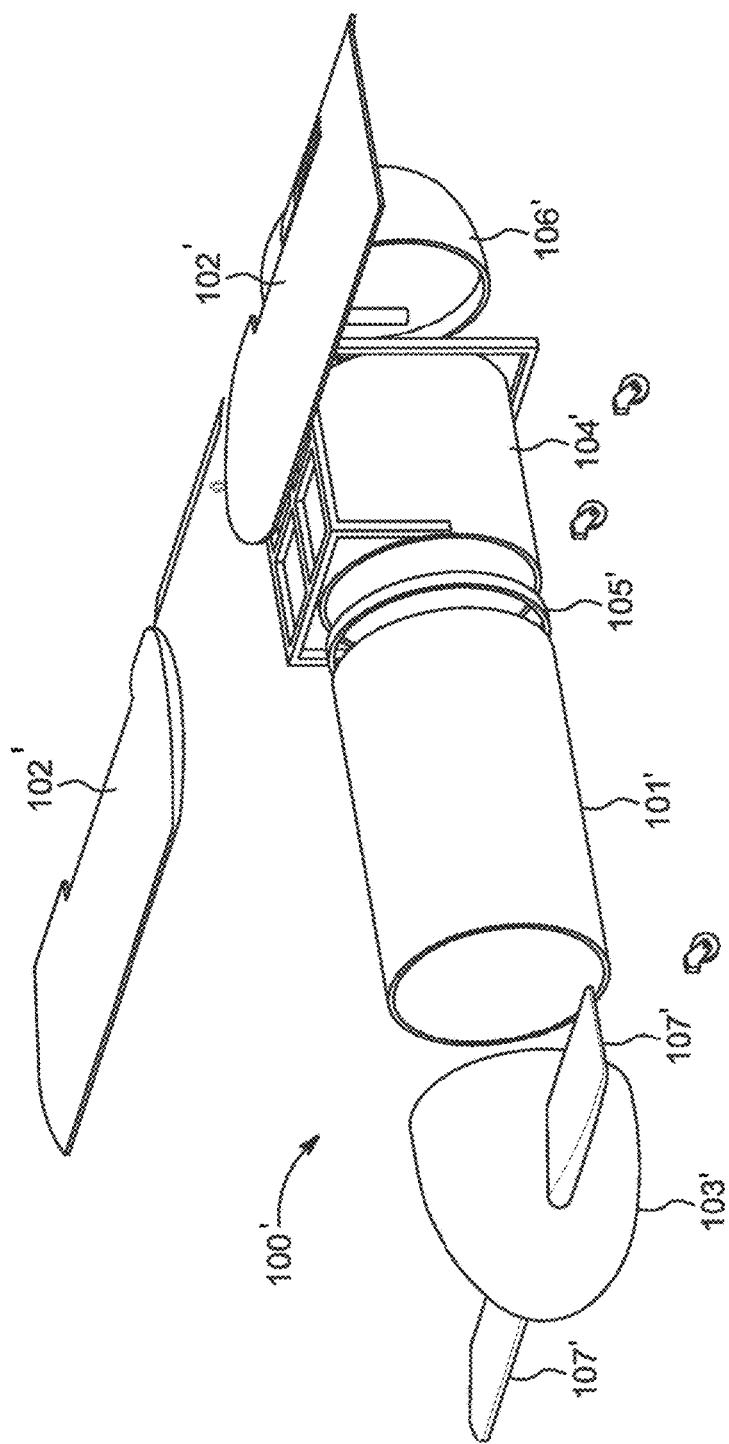
FIG. 27 is an exploded view of an exemplary embodiment of a UAV according to the disclosure.

An exploded view of an exemplary embodiment of an airborne system according to the present invention is illustrated in FIG. 27. The exemplary embodiment can include an unmanned aerial vehicle (UAV) 100', that can include a fuselage 101', a main wing system 102' that may include a cargo hold 104', an optional seal end or detachable cap 106', a nose cone 103' with an optional canard wing system 107', a guidance system (not shown), and a flight control system (not shown). The UAV 100' can be used as a delivery aircraft.

The fuselage 101' can be used for carrying a payload. The fuselage is illustrated as a substantially round cross section, however, the shape of the fuselage is not limited to a cylinder. In exemplary embodiments the fuselage can have a rectangular cross section. In alternative embodiments the fuselage can have an irregularly shaped cross section. In yet alternative embodiments the fuselage can have a square cross section. In preferred embodiments, the fuselage will generally have an aerodynamic cross section. The fuselage can be designed to carry any number of supply. The fuselage can be designed to carry food. The fuselage can be designed to carry tools. The fuselage can also be designed to carry various mechanical and/or electronic equipment. The type of electronic equipment is not limited, examples may include sensors, cameras, radios, or portable electronics. The fuselage can be designed to carry fluid. For example, the fuselage can be designed to carry water. In exemplary embodiments the fuselage can also be designed to carry chemicals or hazardous materials.

The fuselage can be formed of any durable material. In exemplary embodiments the fuselage is made of metal or metal alloy. In exemplary embodiments the fuselage can be made of aluminum (Al). In alternative embodiments, the fuselage can be made of plastic. In yet alternative embodiments, the fuselage can be made of fiberglass. The fuselage can alternatively be made of wood. In exemplary embodiments, the fuselage may also be formed using any combination of the above identified materials. In preferred embodiments, the fuselage is made of a light weight material. For example, a preferred embodiment can include a fuselage made of rolled aluminum sheet metal welded to cast aluminum bulkheads.

The fuselage can be equipped with any necessary equipment for the safe storage of the supply. For example, the fuselage can be equipped with impact foam or other padding. In alternative embodiments, the fuselage can be equipped with temperature controlled system that is able to maintain the payload at a set temperature. The fuselage can be equipped with insulation. The inside of the fuselage can be equipped with one or more braces that can clamp the payload and tightly secure it in a desired manner. In exemplary embodiments, the inside of the fuselage can also be compartmentalized.

In an exemplary embodiment the UAV can to carry supply load of up to 700 lb. The supply load may be stored solely in the fuselage. In the alternative, as described in more detail below, the supply load can be carried in the fuselage and cargo hold. Alternatively, the supply load can be carried at least in part in the sealed end or detachable cap. In yet the supply load can be carried at least in part in the nose cone that can be either integral with or detachably connected to the fuselage. In one embodiment, the supply load can be contained in a volume space that is 2 feet by 2 feet by 6 feet. The volume space may be cylindrical. The volume space can alternatively be a rectangular prism shape. The volume can alternatively be a non-geometric shape. The supply load can be protected and suspended in high impact foam located inside the fuselage.

In exemplary embodiments the fuselage can be made to separate from the UAV and be used as a portable storage device. The fuselage can be equipped with features to ease its transport. The fuselage can be equipped with one or more handles. The fuselage can also be equipped with wheels. The wheels can be retractable so as to prevent damage during landing of the UAV. The wheels can also be fixed. Alternatively, the fuselage can be designed to include a storage box. The storage box can be designed to fit inside the fuselage. The storage box can be designed to fit such that it is well protected by impact foam also provided inside the fuselage. In exemplary embodiments the storage box is surrounded by impact foam while inside the fuselage. The storage box can be used to store the supply intended for delivery. Once delivered by the UAV, the storage box can be removed from the fuselage for ease of transport of the supply without necessitating the carrying of any other portion of the UAV or of the fuselage.

The fuselage can be designed to engage main wing system 102'. The main wing system can have any suitable wingspan. In exemplary embodiments the wingspan of the main wing system can be 20 feet. In alternative embodiments the wingspan can be anywhere between one inch and 50 feet. For example, the wingspan can be 1 in, 6 in, 1 ft, 5 ft, 10 ft, 15 ft, 20 ft, 25 ft, 30 ft, 35 ft, 40 ft, 45 ft, or 50 ft. These are just exemplary sizes. The size of the wingspan will depend on the overall size of the UAV, the payload weight it must carry and the desired glide ratio, among other factors. In exemplary embodiments the one or more wings of the main wing system can include an airfoil design. In preferred embodiments, the airfoil design is a National Advisory Committee For Aeronautics ("NACA") 4309 with a 3 ft chord. Other designs however may also be employed. The one or more wings that are part of the main wing system can also include one or more flight control actuators.

The one or more wings of the main wing system can include wing control surfaces configured to control the aircraft in yaw (as in a flying wing design). For example, the one or more flight control actuators can be used to control flight control surfaces such as flaps, spoilers, and/or ailerons that can be part of the one or more wings of the main wing system. The flight actuators can be electric actuators. Alternatively, the flight actuators can be pneumatic. In one pneumatic actuator embodiment, the fuselage may be designed to be airtight, and after the payload is placed inside the fuselage, the fuselage may be pressurized with compressed air or other gas, which may then be used in flight to provide pressure to the pneumatic actuators for flight control. This unusual control strategy is workable in the present invention, because of the very short duration flight times starting from the time of jettison at altitude all the way to the landing phase on the ground, which in exemplary cases gives a total flight time for the aircraft of approximately 10-20 minutes. In alternative embodiments the actuators can be hydraulic actuators. The actuators can be controlled by the on-board automatic flight guidance system. Alternatively, the actuators can be designed to receive commands from a remote operator. The connection to between the actuators and the on-board flight guidance system can be either wireless or by use of cables such as USB, Ethernet, fiberoptics and the like. Wireless connection can be radio, wi-fi, or similar method. The remote control signals can also be transmitted by way of any suitable wireless communication, including radio signals.

Use of ailerons can avoid the need for a vertical stabilizer or rudder to control yaw. In an exemplary embodiment the main wing system includes at least two wings. Each wing can have an independently operable aileron. Each wing can also have an independently operable spoiler or flap. Controlling of the flight control actuators and thus of the ailerons, spoilers or flaps can be performed either by remote control or can be accomplished via a controller located on board of the UAV. In exemplary embodiments the controller can determine the operation of the flight control actuators based on information such as global positioning system (GPS), altitude, desired destination, weather conditions, other flight conditions and the like. A more detailed description of the control equipment is provided later in this specification.

The flight control actuators and the control equipment on board the UAV can be powered by a power source. The power source can be one or more batteries. The one or more batteries can be stored anywhere on the UAV. In exemplary embodiments the batteries are also located inside the one or more wings of the main wing system. In alternative embodiments the one or more batteries can be stored in the fuselage. Alternatively, the one or more batteries can be stored in the cargo hold. The one or more batteries may be stored in the sealed end or detachable end of the cargo hold. In the alternative, the one or more batteries can be located in the nose cone. Alternative power source to a battery can be a capacitor. A capacitor may be stored in similar locations described above for the batteries. Other similar power storage devices can also be employed. The storage device, be a battery, capacitor or other structure can be rechargeable.

In exemplary embodiments, the power source can be recharged while the UAV is in flight. In alternative embodiments, the power source can be jettisoned from the UAV once depleted. In alternative embodiments, the power source can be replaced while the UAV is in flight. Alternatively, the power source can be recharged, removed or replaced before or after the UAV is in flight. In yet alternative embodiments, the power source can be one or more energy cells, such as for example solar cells. Solar cells can be located on the one or more wings of the main wing system. Solar cells can also be located on the canard wings if the UAV is so equipped. Solar cells may also be located anywhere on the body of the UAV. In preferred embodiments, one or more solar cells will be located such that they obtain best exposure to sunlight at least during UAV operation or flight.

In exemplary embodiments the fuselage is permanently attached to the main wing system. In alternative embodiments the fuselage is detachably engaged to the main wing system. In yet alternative embodiments the fuselage includes a permanently attached main wing system and also can detachably engage a second main wing system.

The main wing system can be constituted of one or more movable wings. In an exemplary embodiment the main wing system includes only one movable wing. In an alternative embodiment the main wing system includes at least two movable wings. In yet another exemplary embodiment, the main wing system includes more than two movable wings.

In alternative embodiments the main wing system can be one or more stationary wings. In exemplary embodiments, the main wing system includes at least one stationary wing. In alternative embodiments the main wing system includes at least two stationary wings. In yet alternative embodiments the main wing system includes more than two stationary wings.

In alternative embodiments, the main wing system can include at least one stationary wing and at least one movable wing.

The wings of the main wing system may be made of any suitable material. In exemplary embodiments the wings are made of metal. For example, the wings can be made of aluminum. In alternative embodiments the wings can be made of plastic. In yet alternative embodiments the wings may be made of fiberglass. In exemplary embodiments the wings can also be made of wood. In preferred embodiments the wings are made of the same material as the fuselage. However, this is not required. In exemplary embodiments the wings may be made of a material different from that used for the fuselage. Also, in exemplary embodiments, the wings can be made of a combination of the above identified materials. In a preferred embodiment the wings can be made of sheet metal bonded to a wing spar structure. In other embodiments, the wing spar and rib structure may be injection molded or cast and then covered by sheet metal, fiberglass, carbon fiber, balsa wood or fabrics. The wing structure may be a resin impregnated wood material that is known to be strong but also biodegradable.

The wings can be of any suitable shape. In exemplary embodiments, the wings of the main wing system have a rectangular shape. In alternative embodiments the wings of the main wing system have a tapered shape.

The wings may also include a shear failure point. In exemplary embodiments, the wings can break off during landing to further absorb the impact. In alternative embodiments, the wings can be made to break off during, or even after landing to make the UAV easier to carry.

The wings of the main wing system can be designed to move in a variety of manners. The movements of the wings can be linear or non-linear. In exemplary embodiments the wings of the main wing system can be rotatable. In exemplary embodiments the wings of the main wing system can be foldable. In alternative embodiments, the wings of the main wing system can be retractable, extendable, detachable, or rollable. The positioning of the wings of the main wing system can also be simple and include only two settings, deployed and stowed. In alternative embodiments, however, the positioning of the wings of the main wing system can be adjustable to any desired position allowed by the mechanism. For example, in embodiments having rotatable wings, the position may be adjusted between full deployment to full stowed by any given degree of rotation. For example the wings could be set at 25 degrees from stowed, 45 degrees from stowed, or half deployed, or 25 degrees from deployed. These are only exemplary embodiments, adjustment of the rotation of the wings can be set as desired. Likewise, the degree of fold, roll, extension and retraction of the wings of the main wing system can be either set as fully deployed or fully stowed or any position there between as may be desired.

Figure 28:
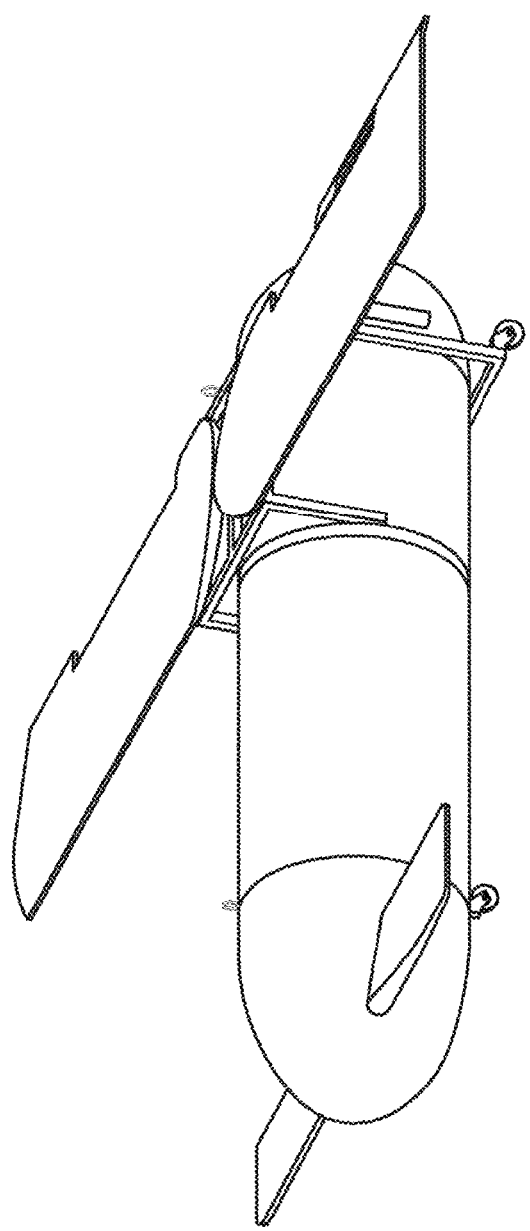
FIG. 28 is an exemplary embodiment of the UAV of FIG. 27 in an exemplary fully deployed state.

An exemplary main wing system including two movable wings is illustrated in FIG. 28 as item 102'. The movable wing can include a mechanism that allows for a stowed and a deployed positioning of the wing.

Figure 29:
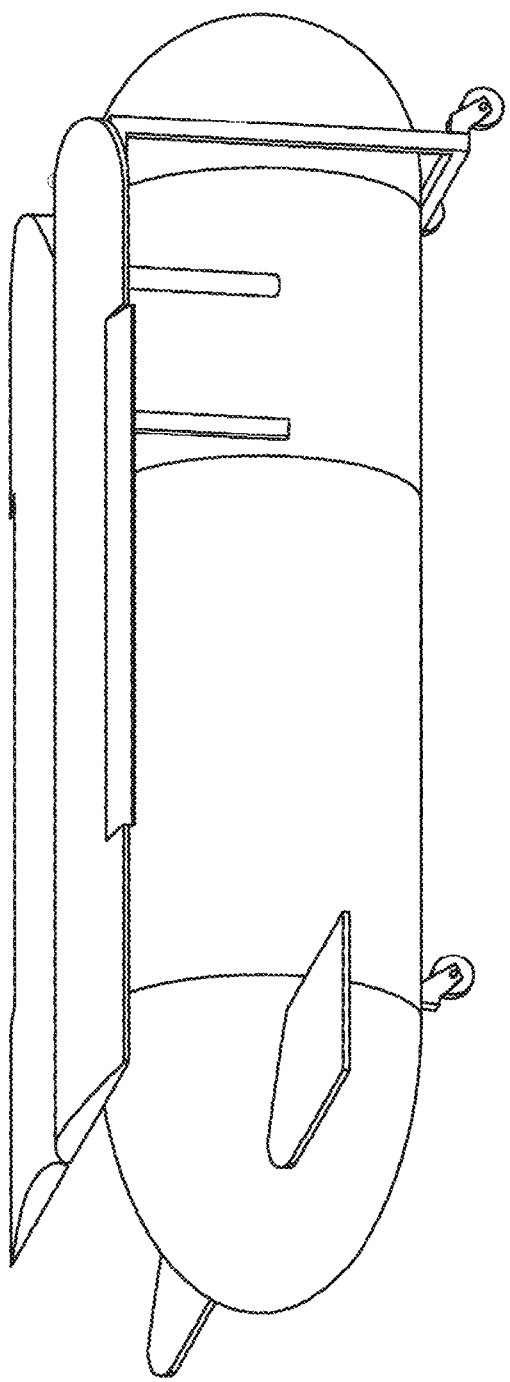
FIG. 29 is an exemplary embodiment of the UAV of FIG. 27 in an exemplary stowed state.
Figure 30:
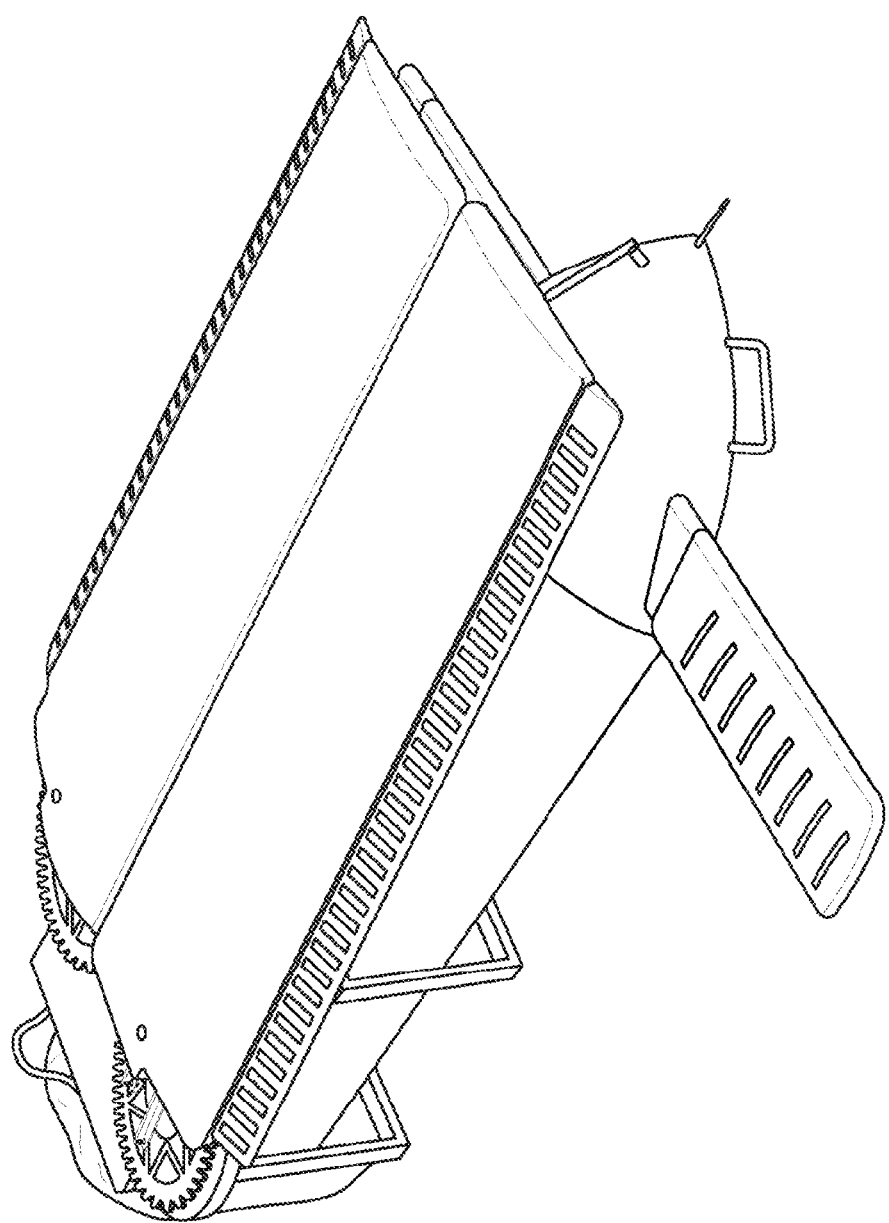
FIG. 30 is an illustrative prototype of an exemplary embodiment of a UAV according to this disclosure in an exemplary stowed state.
Figure 31:
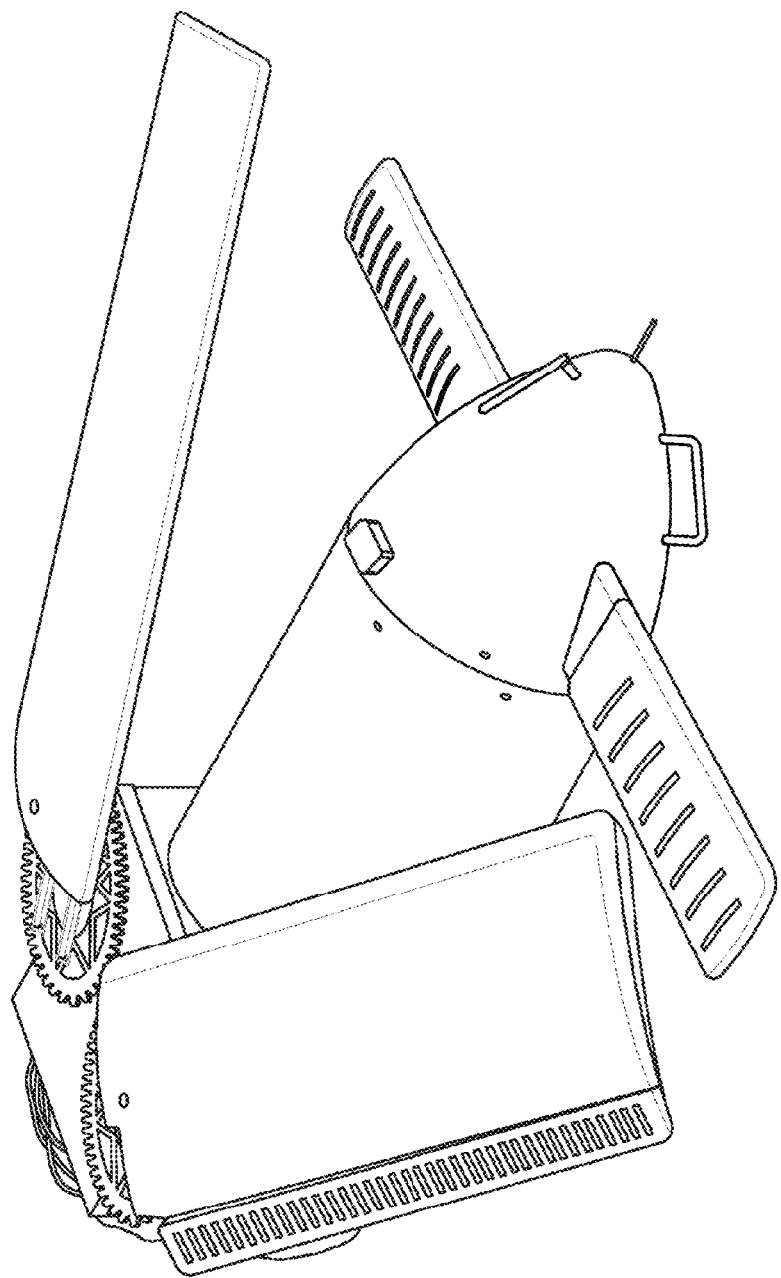
FIG. 31 is an illustrative prototype of an exemplary embodiment of the UAV of FIG. 30 in a partially deployed state.
Figure 32:
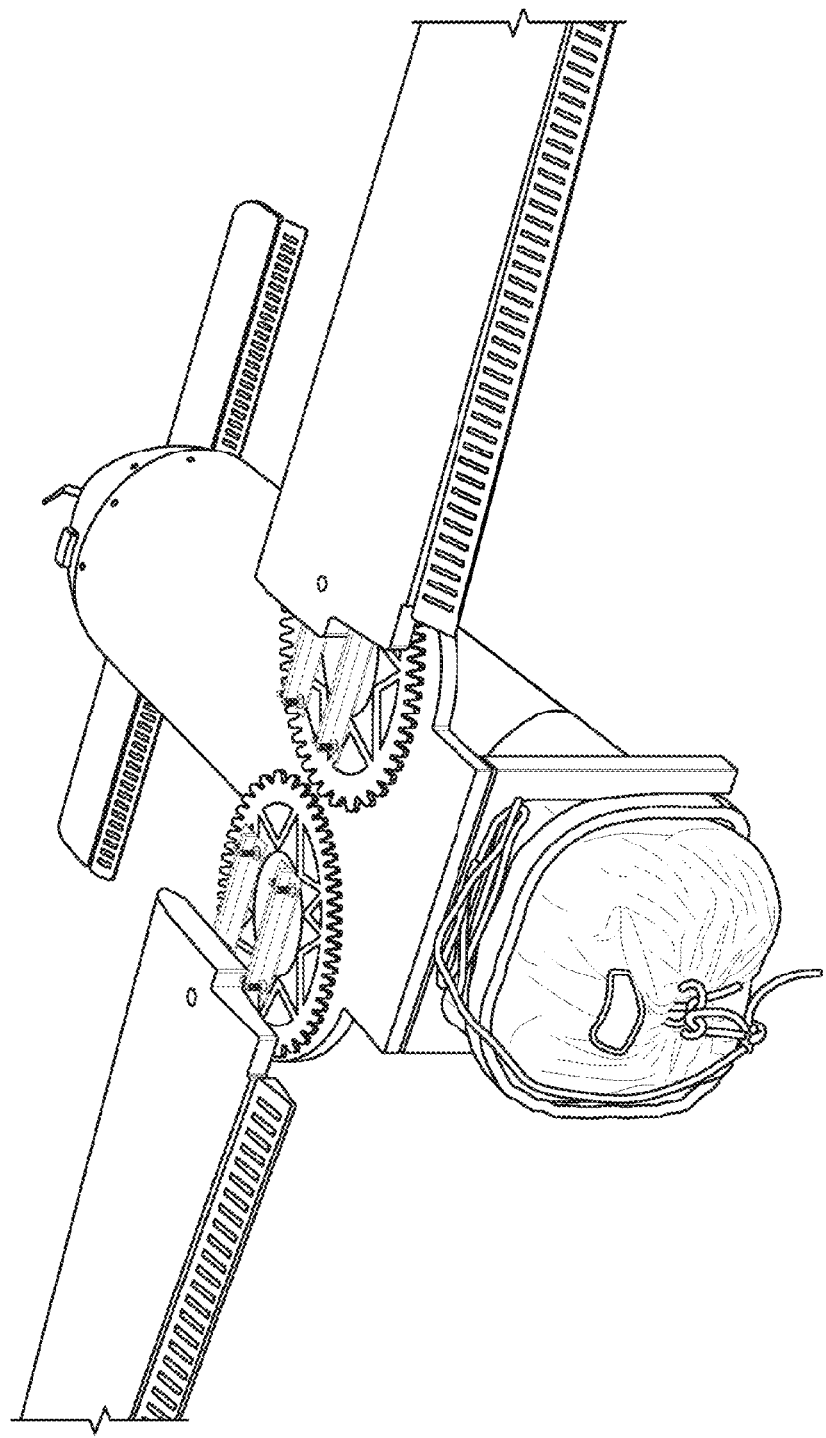
FIG. 32 is an illustrative prototype of an exemplary embodiment of the UAV of FIG. 30 in an exemplary fully deployed state showing an alternate static line deployable drogue parachute attached to the rear of the UAV and the exposed wing deployment gears through which a chain passes to move the wings from the stowed to the deployed position by the chain being pulled upon by the drogue chute after being jettisoned from the mothership at a predetermined altitude.

FIGS. 28, 31 and 32 show embodiments in which the movable wings are set in deployed state and partially deployed state. In this exemplary embodiment, the wings can be positioned substantially perpendicular to the fuselage as illustrated. FIGS. 29 and 30 instead show exemplary embodiments in which the wings are in a stowed position. In this exemplary embodiment the wings can be positioned substantially longitudinally aligned with the fuselage as illustrated.

In exemplary embodiments, the movable wing mechanism can include a set of gears that can be used to rotate or fold the one or more wings. For example, the gears may include one or more toothed round gears. The gears can include sprockets. The gears can include chains or cables. In an exemplary embodiments, the gears include a chain and sprockets. The gears can be attached to the one or more wings of the main wing system. The gears may be arranged so as to operate at the same time thus resulting in the simultaneous rotation of the one or more wings of the main wing system. In an exemplary embodiment, the set of gears includes two main toothed gears, each gear connected to a wing. As each gear is rotated the wing attached thereto also rotates between a stowed position and a deployed position.

The gears can be triggered into motion in a variety of manners. In exemplary embodiments, the gears can be triggered mechanically. In alternative embodiments the gears can be triggered electronically. In other embodiments the gears can be triggered magnetically. The triggering can be done through direct connection. In alternative embodiments, the triggering can also be done wirelessly. For example, the triggering can be done by remote control. In alternative embodiments the triggering can be accomplished automatically based on a set of predetermined conditions. For example, a sensor may be provided on the UAV that upon its sensing that the UAV has been launched it automatically signals the triggering mechanism to deploy the wings of the main wing system.

In exemplary embodiments, the gears can be triggered to deploy the wings of the main wing system by way of a parachute pull. In such exemplary embodiments, the UAV can be equipped with a drogue parachute that can deploy after the UAV has been launched or jettisoned. In exemplary embodiments the drogue parachute can be a 10 ft canopy drogue parachute. As the parachute opens, it can be designed to pull on the gear mechanism causing setting it into motion and thus deploy the wings of the main wing system. For example, the drogue parachute can pull on a chain or cable attached to the gears or sprockets to pull the wings into the deployed position. The system can further be design to dislodge the parachute once the gear system has been triggered to deploy the wings of the main wing system. For example, the chain pulled by the drogue parachute can be designed to reach its last tooth on the sprocket or gear system once the wings have been deployed, thus resulting in the chain, and consequently the drogue parachute, separating from UAV once the wings have been deployed. A cable system can be similarly be designed. Alternatively, the gears or sprockets can be designed to pinch and cut the cable loose once the wings have been deployed, thus separating the parachute from the UAV. The parachute in this exemplary embodiment can be stored anywhere on the UAV that can accomplish the triggering goal without interfering with the operation of the UAV. In exemplary embodiments, the parachute is located on the rear of the UAV. In exemplary embodiments, the parachute is provided as described in more detail below in conjunction with the description of the sealed end or detachable cap.

In exemplary embodiments, the gears are designed to lock into position once the wings have been moved into the desired position. For example, the gears can lock into position after the wings have been rotated from a stowed position to a deployed position. The locking of the gear can be accomplished mechanically. For example, the gears can be locked using a rachet, a spring actuated shaft or similar mechanism. In exemplary embodiments, the locking mechanism permanently locks the gears in place. In alternative embodiments, the locking mechanism can be dislodged. The locking mechanism can be operated manually, mechanically, electronically, or magnetically.

In exemplary embodiments, the main wing system may be designed to engage with the fuselage by way of a securing bracket. In alternative embodiments, as described later, the main wing system may be engaged with the fuselage with belts. In alternative embodiments, the main wing system can include a cargo hold 104' to improve structural integrity. The cargo hold can be fixed to the main wing system by way of brackets, bolts or like structure. In an exemplary embodiment the cargo hold can also be fixed to the main wing system by straps. The design of the cargo hold is not particularly limited. In exemplary embodiments the cargo hold is designed to mimic the shape of the fuselage. The cargo hold can be designed to engage the fuselage so that the fuselage can be securely connected to the cargo hold and thus the main wing system. The cargo hold can be hollow to allow for additional storage of supply. In exemplary embodiments, the cargo hold can be designed to constitute an extension of the fuselage. In alternative embodiments, the cargo hold can provide a compartment that is separate from the fuselage. The cargo hold can be designed similar to the fuselage discussed previously. Like the fuselage, the cargo hold may include insulation, padding, and/or impact foam. The cargo hold can include a temperature controlled system. The cargo hold may also include electronics such as GPS, flight control system, communication system, power or battery system and the like.

The cargo hold and fuselage may be able to engage using a variety of methods. In exemplary embodiments the cargo hold can be designed to engage the fuselage using one or more clamps. In alternative embodiments, the fuselage and cargo hold can be engaged by way of push-to-connect fitting. In alternative embodiments, the connection between the fuselage and the cargo hold can be achieved using bolts. In alternative embodiments the fuselage and cargo hold can be engaged by a tight fitting design in which a portion of either the fuselage or cargo hold fits inside a portion of the other. In alternative embodiments, the cargo hold and fuselage can be engaged using straps. Any combination of the above fastening mechanisms may also be employed. In exemplary embodiments, when connected the fuselage and cargo hold can form a sealed or air tight connection. In exemplary embodiments, a fitting 105', such as rubber or metal, can be employed to either secure, seal or make the connection between the fuselage and cargo hold air tight.

Connecting and disconnecting the fuselage from the cargo hold can be accomplished manually or by automation. In exemplary embodiments the connection and disconnection can be performed manually. In alternative embodiment the connection is performed manually and the disconnection can be accomplished automatically via remote control or by a trigger system set to disconnect the fuselage based on a predetermined conditions. For example, time, landing status, or by entering a combination through a pad that can be provided on the outside of the fuselage or cargo hold. In alternative embodiments a trigger mechanism may also be deployed using a magnet. The connection and disconnection may be accomplished through a combination of manual and automatic or electronic means such as trigger or like device as described above.

On the opposite side from where the fuselage can be connected, the cargo hold may include either a sealed end or a detachable cap. In embodiments without a cargo hold, i.e. where the fuselage is connected to the main sing system only by way of brackets, frames and/or clamps, the sealed end or detachable cap described herein can be connected directly to the fuselage in the same manner described herein with respect to the cargo hold. In exemplary embodiments, the cargo hold may include a sealed end that cannot be accessed. In the alternative the sealed end may be equipped with an access door or hatch. In alternative embodiments, the cargo hold may include a detachable cap 106'. The sealed end or detachable cap 106' can be made of the same material as the cargo hold. In alternative embodiments, the sealed end or detachable cap 106' can be made of the same material as the fuselage. In alternative embodiments the sealed end or detachable cap 106' can be made of a material that is different from that of the cargo hold. Still, any material used for the cargo hold can be used for the sealed end or detachable cap. Exemplary materials include, but are not limited to, metal, plastic, fiberglass and wood. In a preferred embodiment the sealed end or detachable cap 106' is made of aluminum.

The design of the sealed end or detachable cap should not be viewed as limited. In exemplary embodiments the sealed end or detachable cap is rounded. In alternative embodiments, the sealed end or detachable cap is squared, rectangular or of an irregular shape. In preferred embodiments, the sealed end or detachable cap will have an aerodynamic design.

The sealed end or detachable cap 106' can provide additional padding or crush foam. In the alternative the sealed end or detachable cap can provide additional storage room. In exemplary embodiments the sealed end or detachable cap can be designed to provide a contiguous storage compartment with the cargo hold or fuselage. In alternative embodiments, the sealed end or detachable cap can provide a separate storage department. Like the cargo hold and fuselage, the sealed end or detachable cap can include insulation, temperature controlled systems, and the like. The sealed end or detachable cap may also be designed to carry liquids, chemicals and/or hazardous materials. A separate storage department may be accessed by a separate access door located on the sealed end or detachable cap. If a detachable cap is used, then the compartment may be accessed by detaching the cap from the cargo hold. In exemplary embodiments, the detachable cap or an access door provided on the sealed end can be used to access the storage box located inside the fuselage. In such an embodiment, the storage box can slide out from the fuselage and, if one is present, through the cargo hold and out the back end for easy extraction of the storage box from the UAV. In exemplary embodiments, the sealed end or detachable cap can provide storage for control equipment of the UAV. For example, the sealed end or detachable cap can be used to store a GPS system, controller, one or more transmitters, memory, battery or other power source.

In exemplary embodiments where a detachable cap is used instead of a sealed end, various designs may be employed to secure the detachable cap to the cargo hold or fuselage. Any of the methods described previously with respect to the connection between the cargo hold the fuselage can similarly be implemented in the connection between the cargo hold or fuselage and the detachable end cap.

In alternative embodiments, instead of a detachable cap or sealed end, the end portion of the fuselage or the side distal to the fuselage of the cargo hold may be equipped with a pouch as shown, for example, in FIG. 32. In yet alternative embodiments, the fuselage or the cargo hold can include a combination of the sealed end and a pouch. In the alternative, the fuselage or the cargo hold can include a detachable cap and a pouch. In this latter embodiments, the pouch may be positioned such that the detachable cap covers and encloses the pouch when the detachable cap is engaged with the fuselage or the cargo hold. In exemplary embodiments, the pouch may be provided on the outside of the detachable cap.

The pouch may be made of fabric or likewise soft material. It can be used for additional storage. In exemplary embodiments the pouch may also be used to contain a parachute. The parachute can be equipped with the necessary trigger mechanism to either automatically deploy under a given condition. The given condition may be a predetermined altitude. In the alternative, the trigger may deploy the parachute at a given time. The given condition may also be in response to a sensor located on the UAV. For example, if an altimeter records a drastic drop in altitude that may be indicative of a malfunction of the UAV. Any other like sensor that would also indicate any malfunction of the UAV. The parachute may also be equipped with a remotely controlled trigger such as an electromechanical solenoid or actuator. Solenoids and actuators are well known in the art and thus will not be described further herein. In exemplary embodiments in which the sealed end or detachable cap encloses the pouch, a trigger mechanism for a parachute may be also coupled to an access door located in the sealed end or detachable cap. Alternatively, the trigger mechanism may detach the detachable cap leaving the pouch exposed and allowing the parachute to deploy. In alternative embodiments, no pouch is used and the parachute is stored in the sealed end or detachable cap and deployed by a trigger mechanism as discussed herein either by way of an escape hatch or by the disconnection of the detachable cap.

At the front end of the fuselage, i.e., opposite from the end where fuselage attaches to the main wing system and/or cargo hold, is a nose cone 103'. The nose cone 103' is illustrated in the shape of a cone, however, this shape is not limited. Notwithstanding the nomenclature used herein, the nose cone can be in a shape other than a cone. In exemplary embodiments the nose cone has a generally circular cross section with a convex, rounded front end. Alternatively, the nose cone can have a flat front end. Exemplary embodiments may include a nose cone with a concave front end. Also, the nose cone can have a non-circular cross-section. For example, the nose cone could have a square, rectangular or irregularly shaped cross section. Preferred embodiments include a nose cone that has an aerodynamic shape. In exemplary embodiments, the cross-sectional shape of the nose cone will mimic the cross-sectional shape of the fuselage. In alternative embodiments, the nose cone will have a different cross-sectional shape that is different from the cross-sectional shape of the fuselage.

The nose cone can be integral to the fuselage or be detachable. In exemplary embodiments where the nose cone is integral to the fuselage, the nose cone constitutes the front end of the fuselage and can be formed either of a contiguous material as the fuselage or can be separately manufactured but permanently attached to the fuselage. In alternative embodiments, the nose cone can be designed to be detachable from the fuselage. The nose cone can be made of any material used to form the fuselage. For example, the nose cone can be metal, wood, fiberglass, or plastic. In exemplary embodiments the nose cone is made of aluminum. The nose cone can be made to match the material as the fuselage. In alternative embodiments, the nose cone is made of a material that is different from that of the fuselage. The nose cone can be affixed to the fuselage in the same manner as the fuselage can be connected to the cargo hold. Likewise, a detachable nose cone can be similarly detached from the fuselage in any of the previously described manners in which the fuselage can be detached from the cargo hold either manually or by automation or remote control.

The nose cone can provide additional storage capacity. In exemplary embodiments, the nose cone can provide a storage space separate from that of the fuselage. In alternative embodiments, the nose cone can provide a storage space that is contiguous to that of the fuselage. The nose cone can also be equipped with an access door or be detachable from the fuselage so as to provide access to a storage box located inside the fuselage. In this manner the storage box can be easily removed from the fuselage from the front of the UAV. The nose cone can also be used to store electronics components to the UAV such as GPS, controllers, one or more transmitters, memory, power sources such as batteries and the like. In an exemplary embodiment, the nose cone is used to carry the controllers, GPS, one or more transmitters, a memory, and one or more power sources for the UAV. In exemplary embodiments, the nose cone can be designed to bear the impact of landing by including padding or crush foam sufficient to protect the supplies stored in the fuselage or elsewhere in the rest of the UAV.

The nose cone can optionally be equipped with canard wing system 107'. The canard wing system can include one or more canard wings. The canard wings can be made of the same materials and designed as the wings of the main wing system. In exemplary embodiments, the canard wings are smaller than the wings of the main wing system. In a preferred embodiment the canard wings are shortened for packaging and the airfoil can articulate as a stabilator for required authority in pitch control. Like the wings of the main wing system, the canard wings can also be equipped with ailerons, spoilers and/or flaps. The ailerons, spoilers and/or flaps can be controlled using actuators as similarly described above with respect to the main wing system. In exemplary embodiments the canard wings are equipped with ailerons. Ailerons can help control the flight of the UAV without a vertical stabilizer or rudder. In exemplary embodiments, unlike the wings of the main wing system, the canard wings have a fixed position. The canard wings can also be configured to control pitch. The canard wings can be configured to control roll. The canard wings can also be configured to control yaw.

In exemplary embodiments, the UAV can be equipped with a triggering mechanism that causes one or more of the above parts to automatically disengage under a given set of conditions. For example, the parts may disengage based on the location of the UAV that can be tracked by GPS and/or altimeter. In a simplified embodiment, the trigger may be activated in response to an altimeter reading. When the UAV is at a predetermined height from the ground, which can range from being on the ground, to a few feet from the ground or a much higher altitude, a signal is sent to the trigger mechanism. The trigger can then cause any one or more of the fastening elements between fuselage, cargo hold, nose cone, main wings, end cap and canard wings to disengage. For example, based on whether the UAV is on the ground or a predetermined height, the trigger mechanism can send a signal to each of the desired fastening elements to disengage. In exemplary embodiments, the system is designed to disengage sufficient fastening elements to allow for easier transportation of the UAV, for example by separating the wings. In alternative embodiments, sufficient fastening elements can be disengaged to provide easy access to the cargo inside the UAV. In yet another embodiment, the fastening elements can be designed to disengage or become loose upon the UAV's impact with the ground. Remote control, location determined by way to for example GPS, or other triggering devices as described throughout this specification can also be used to loosen, disconnect, or otherwise separate the fastening elements.

The UAV can include a guidance system. In exemplary embodiments, the guidance system can be an on-board autonomous system. Alternatively, the guidance system can be controlled via remote control. For example, the UAV may include a radio controlled guidance system. In exemplary embodiments, the UAV may include a combination of remote controlled and autonomous guidance system. In one embodiment, the UAV can include an on-board autonomous guidance system that can a user can override via radio control. Such autonomous control systems typically comprise hardware and software elements. The hardware of such systems is becoming known in the art of UAV guidance such as manufactured by 3D Robotics of San Diego, Calif. Autonomous control software is becoming known in the art of UAV guidance and may be installed as firmware on various hardware platforms. One example of autonomous UAV firmware is APM:Plane provided by 3D Robotics, which is open source and thus can be easily customized for different unmanned aircraft configurations and missions. A mission planning software tool may be used to pre-program the autonomous autopilot with coordinates and altitudes for a particular mission. One example of such mission planning software is Mission Planner Ground Control Station software provided by 3D Robotics.

An on-board autonomous guidance system may include autopilot flight controls. The on-board autonomous guidance system can receive information regarding the jettison or deployment location, the altitude at which the UA Vis jettisoned, and the intended landing location. In addition to the location, the information may also include the altitude of the landing location. The landing altitude, however, is not strictly needed since it can also be determined from a terrain database or determined by an onboard ground proximity sensing system such as a remote sensing technology that measures distance by illuminating a target with a laser and analyzing the reflected light, for example a Light Detection and Ranging system (LIDAR), laser altimeter, range finder, sonar sensor, infrared sensor, or a length of wire hanging below the fuselage of the UAV during flight with a sensor at the distal end of the wire configured to make first contact with the ground and transmit a triggering signal.

The information can be uploaded prior to jettisoning the UAV. In exemplary embodiments, the information may be uploaded by way of wireless telemetry, USB cable, Ethernet cable, fiberoptic cable, radio transmission, wi-fi connection, or by physical connection or insertion of a memory device in or to the UAV. Alternatively, the information may be provided or updated during deployment of the UAV, i.e. after the UAV has been jettisoned. Any suitable wireless communication can be used to transmit the data to the UAV guidance system whether it is to actively control the UAV or to feed information to the on-board autonomous guidance control system. In alternative embodiments, the on-board autonomous guidance system can be designed to determine the location and altitude of the UAV autonomously. In such exemplary embodiment, the only information to feed to the on-board autonomous guidance system is the landing location. In addition to the landing location, the information may also include the altitude of the landing location. Although, the altitude of the landing location can be also determined through other means described above, such as ground proximity sensing system or a terrain database. This information can be provided either before or after the UAV is jettisoned. The information fed to the on-board autonomous guidance system can be provided either by an operator or by a main frame or separate controller unit. Information about weather conditions including, for example, wind speed and wind direction can also be provided or sensed in real-time by on-board sensors such as an airspeed sensor compared to a second velocity sensor such as GPS with a function of the difference in speed measurements representing the approximate winds aloft direction and velocity.

The guidance control system of exemplary UAVs may include global position system (GPS) waypoint navigation. The control system may include inertial measurement units that provide attitude information for aircraft, including heading, pitch, yaw, and roll. Exemplary embodiments include mechanical gyroscopic flight instruments. Preferred embodiments include an attitude and heading reference system (AHRS). AHRS can include either solid-state or microelectromechanical systems (MEMS) gyroscopes, accelerometers and magnetometers on all three axes. In exemplary embodiments, the guidance control system can include 6 degrees of freedom (DOF) AHRS. The guidance control system can also include a pitot-static system that can be used to determine an aircraft's airspeed, Mach number, altitude, and altitude trend. The guidance control system can also include a magnetic compass. The control system can include a barometric pressure altimeter. As described earlier, the control system can include a LIDAR laser altimeter. The control system can also include customizable autoland routines. The control system can also include an automatic stall prevention code. The control system can further include differential aileron algorithms. The control system can include failsafe modes. The control system can also include user configurable firmware. The control system can further be equipped with mission planning software.

The UAV can be jettisoned or deployed from either a stationary base or a moving craft. In exemplary embodiments, the UAV can be jettisoned or deployed from a moving aircraft (mothership). The mothership can be any aircraft that is capable of carrying and jettisoning the UAV. The mothership can be a manned aircraft. Alternatively, the mothership can itself be an unmanned aircraft. As an unmanned aircraft the mothership can either have its own autopilot or autonomous flight control system, or it can be controlled remotely. In exemplary embodiments, the mothership may be a combination of manned and unmanned type of aircraft and autonomous and remotely controlled aircraft. In an exemplary embodiment, the mothership can be a C-130 aircraft. Although other similar aircrafts can also be used. For example, CH-53 or MV-22 or any like aircraft. The UAV can be carried inside the mothership, for example in the cargo bay. In alternative embodiments, the UAV can be carried outside the mothership such as in a slingload configuration underneath a mothership such as a helicopter. The operator of the mothership can cause the slingload to release the UAV at a location and altitude where jettisoning is desirable. The slingload may comprise a cable or a net to hold the UAV. The cable may be released to jettison the UAV. In the case of a cargo net, the net may be released partially or completely from the mothership to cause the UAV to separate and fall away from the mothership at a predetermined location. In alternative embodiments, the UAV can be placed inside a tube inside or external to the mothership that acts to keep the wings of the main wing system folded and once ejected from the tube at the jettison location, the wings of the main wing system can have a spring loaded deployment feature that causes the wings of the main wing system to rotate into a locking position once free of the deployment tube.

In exemplary embodiments, the UAV described herein are expendable UAV (EUAV). EUAV can be designed for single deployment and can be produced very cost effectively.

In an exemplary embodiment, the EUAV can be loaded with up to 700 lbs of supply. The EUAV can include the payload contained in a 2 ft×2 ft×6 ft space in the fuselage. The main wing airfoil can be a NACA 4309 with a 3 ft chord. At full gross weight, the glide ration can be 12:1 and give a standoff distance of 24-49 miles when jettisoned at altitudes of 12,000 and 25,000 feet, respectively.

Exemplary embodiments include a cargo case space in the fuselage that makes loading and unloading easy and can be well protected during landing by a 5 ft long crumple zone with high impact foam. Such cargo cases are manufactured by Pelican Products Inc. of Torrance, Calif. The fuselage can also include provisions on its underbelly for forklift skids as well as numerous lifting eyes and cargo rings to provide for secure airborne transport to the drop zone. In exemplary embodiments the airframe can weigh 250 lbs, plus 50 lbs. for the fuselage and impact foam, that together with a 700 lb supply load results in a max gross weight of 1,000 lbs.

In exemplary embodiments, the max gross best glide speed can be 86 knots with a sink rate of 15 fps (900 fpm), which can be reduced to 0 fps/fpm during the full stall landing. Autonomous flight can be accomplished by a modified COTS fixed-wing autopilot. The landing routine can begin when the on-board LIDAR sensor detects terrain proximity approximately 150 ft AGL and begins slowing the EUAV craft, ultimately commanding all ailerons (preferably 4) and stabilators (preferably 2) to their full down positions to act as spoiler/flaps followed by a pitch-up, full stall landing within 100 ft of the intended drop zone. The EUAV can achieve a vertical sink rate of 0 fpm at the point of touchdown.

As mentioned above, a cargo container such as those manufactured by Pelican Products, Inc. may be used to contain and protect the cargo. In an exemplary embodiment, the cargo container itself may form the fuselage of the UAV or EUAV.

Figure 33:
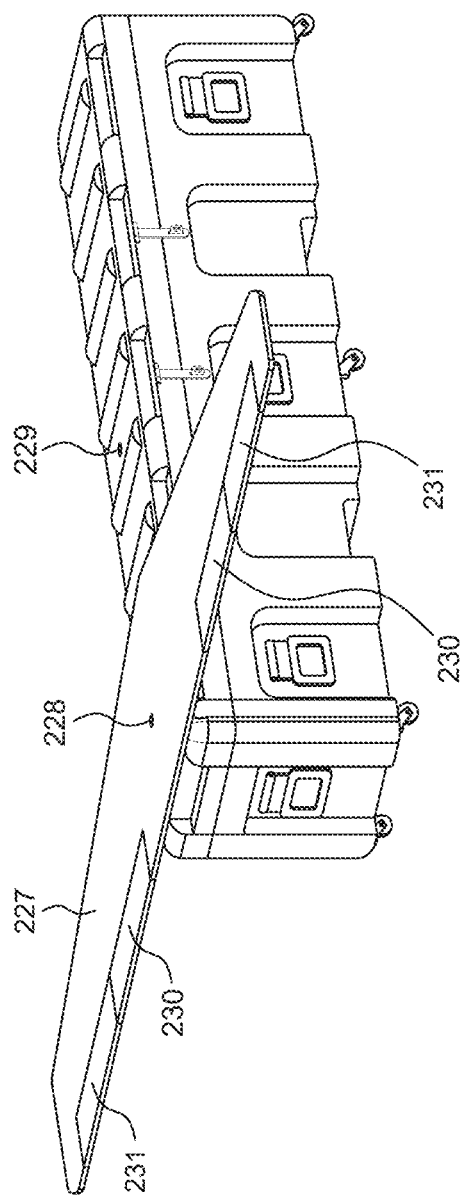
FIG. 33 is an exemplary embodiment of the UAV of the present invention showing a fuselage cargo container acting as the fuselage of the UAV and having a pivoting wing.

FIG. 33 is an exemplary embodiment of the UAV of the present invention showing a fuselage cargo container acting as the fuselage of the UAV and having a centrally pivoting wing 227 with a pivot point 228. The centrally pivoting wing may be manufactured in one piece and pivot through 90 degrees when being deployed from a mothership. The position of the centrally pivoting wing relative to fuselage cargo container in FIG. 33 is to the rear of the container, but it is to be understood that a person practicing the invention could make the position of the wing moveable relative to the container depending on the weight and balance of the cargo load. In one embodiment, the wing could be located at the middle of the container indicated by 229. The wing may have one or more flight control surfaces and in one embodiment, have two inner ailerons 230 and two outer ailerons 231.

Figure 34:
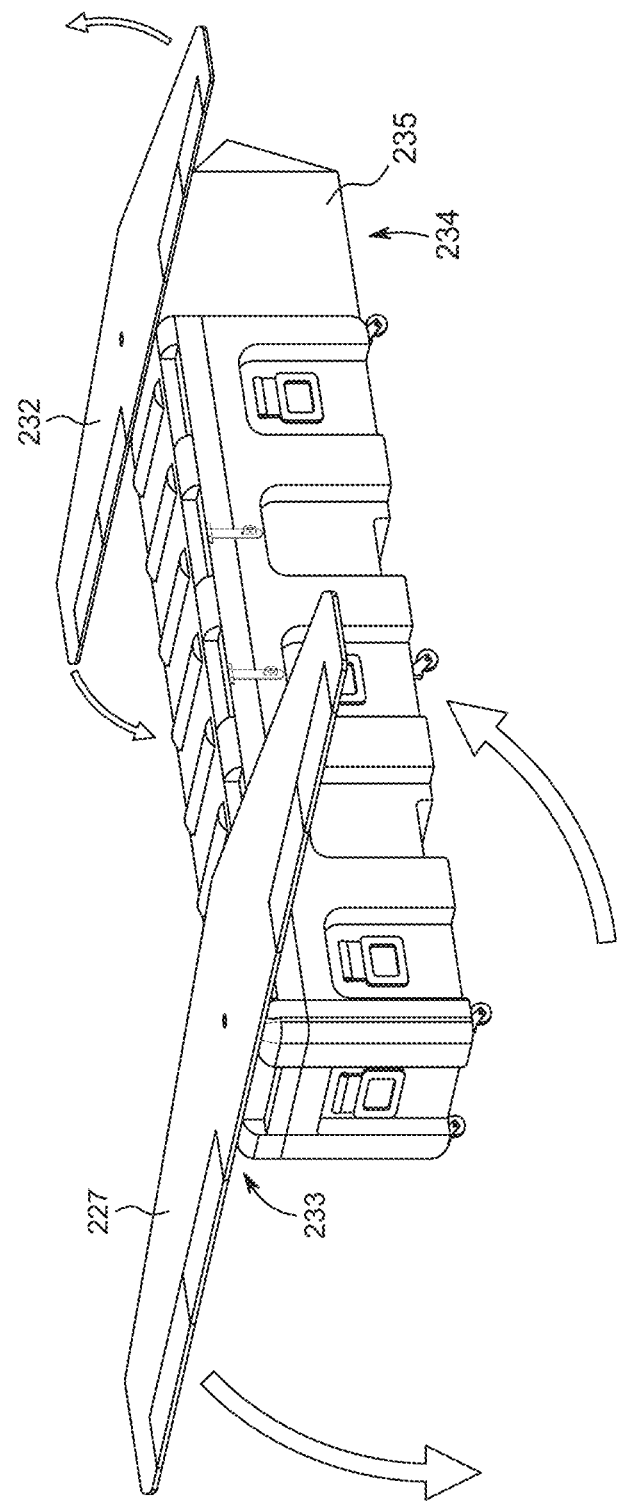
FIG. 34 is an exemplary embodiment of the UAV of the present invention showing a fuselage cargo container acting as the fuselage of the UAV and having a pivoting main wing and a pivoting canard wing.

FIG. 34 is an exemplary embodiment of the UAV of the present invention showing a fuselage cargo container acting as the fuselage of the UAV and having a pivoting main wing and a pivoting canard wing 232. The pivoting action of the main wing and canard wings may be in any direction and number of degrees, and in one embodiment pivot through 90 degrees from a stowed to a deployed position. The main wing and canard wing may be directly attached to the top of the fuselage cargo container as the main wing is depicted in FIG. 34 shown by arrow 233, or in the alternative, either wing may be mounted atop a separate extension portion of the fuselage cargo container as the canard wing is depicted in FIG. 34 shown by arrow 234. In one embodiment, the canard wing is mounted on top of a detachable nose cone 235.

In an exemplary embodiment the UAV can to carry supply load of up to 700 lb. The supply load may be stored solely in the fuselage. In the alternative, as described in more detail below, the supply load can be carried in the fuselage and cargo hold. Alternatively, the supply load can be carried at least in part in the sealed end or detachable cap. In yet the supply load can be carried at least in part in the nose cone 235 that can be either integral with or detachably connected to the fuselage. In one embodiment, the supply load can be contained in a volume space that is 2 feet by 2 feet by 6 feet. The volume space may be cylindrical. The volume space can alternatively be a rectangular prism shape. The volume can alternatively be a non-geometric shape. The supply load can be protected and suspended in high impact foam located inside the fuselage.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An unmanned delivery aircraft comprising:
a first portion including a fuselage;
a second portion coupled to the first portion, the second portion including a cargo hold;
a first movable wing system coupled to the first portion including the fuselage; and
a second movable wing system coupled to the second portion including the cargo hold,
wherein:
the second portion is separable from the first portion, and
at least one of the first movable wing system or the second movable wing system is pivotable from a stowed position to a deployed position.

2. The unmanned delivery aircraft of claim 1, wherein the first movable wing system and the second movable wing system each comprise two wings, and at least one of the first movable wing system or the second movable wing system is configured to pivot between the stowed position and the deployed position.

3. The unmanned delivery aircraft of claim 2, wherein:
a rotation angle between the stowed position and the deployed position is 90 degrees, and
wherein the stowed position of the wings is substantially longitudinally aligned with the fuselage.

4. The unmanned delivery aircraft of claim 2, wherein the two wings of the first movable wing system are vertically spaced at different elevations relative to the two wings of the second movable wing system.

5. The unmanned delivery aircraft of claim 2, further comprising a static line coupled to at least one of the first movable wing system or the second movable wing system to move at least one of the first movable wing system or the second movable wing system between the stowed position and the deployed position.

6. The unmanned delivery aircraft of claim 5, wherein the second portion is coupled to the first portion by one or more fastening mechanisms.

7. The unmanned delivery aircraft of claim 5, wherein the static line is connected to a drogue parachute.

8. The unmanned delivery aircraft of claim 7, wherein the drogue parachute is equipped with a trigger mechanism to deploy at a predetermined altitude.

9. An unmanned delivery aircraft comprising:
a first portion including a fuselage;
a second portion coupled to the first portion, the second portion including a cargo hold;
a first movable wing system coupled to the first portion including the fuselage; and
a second movable wing system coupled to the second portion including the cargo hold,
wherein the second portion is separable from the first portion.

10. The unmanned delivery aircraft of claim 9, wherein the cargo hold comprises a hollow cavity defined therein to allow for storage of cargo.

11. The unmanned delivery aircraft of claim 10, further comprising:
braces included within the hollow cavity of the cargo hold to secure cargo; and
wherein the hollow cavity of the cargo hold includes a compartment that is separate from the fuselage.

12. The unmanned delivery aircraft of claim 9, wherein the second portion including the cargo hold comprises an extension of the first portion including the fuselage.

13. An unmanned delivery aircraft comprising:
a fuselage comprising a first portion removably coupled to a second portion;
a first movable wing system coupled to the first portion of the fuselage; and
a second movable wing system coupled to the second portion of the fuselage,
wherein at least one of the first movable wing system or the second movable wing system is pivotable from a stowed position to a deployed position.

14. The unmanned delivery aircraft of claim 13, further comprising a tail cone.

15. The unmanned delivery aircraft of claim 14, wherein the tail cone is inflatable.

16. The unmanned delivery aircraft of claim 15, further comprising a series of spring steel wires to hold open the tail cone.

17. The unmanned delivery aircraft of claim 13, further comprising a drogue parachute comprising a trigger mechanism to deploy at a predetermined altitude.

18. The unmanned delivery aircraft of claim 13, further comprising:
a static line; and
a drogue parachute coupled to the static line and at least one of the first movable wing system or the second movable wing system, wherein deployment of the drogue parachute causes the static line to move at least one of the first movable wing system or the second movable wing system between the stowed position and the deployed position.

* * * * *